(12) United States Patent
Jung et al.

(10) Patent No.: US 11,425,243 B2
(45) Date of Patent: Aug. 23, 2022

(54) ELECTRONIC DEVICE TO WHICH INCOMING CALL SCREEN IS OUTPUT AND METHOD FOR OUTPUTTING INCOMING CALL SCREEN

(71) Applicant: SAMSUNG ELECTRONICS CO., LTD., Gyeonggi-do (KR)

(72) Inventors: Jinki Jung, Gyeonggi-do (KR);
Sungwon Park, Gyeonggi-do (KR);
Jaein Yoo, Gyeonggi-do (KR);
Yongkoo Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 14 days.

(21) Appl. No.: 17/266,894

(22) PCT Filed: Aug. 6, 2019

(86) PCT No.: PCT/KR2019/009827
§ 371 (c)(1),
(2) Date: Feb. 8, 2021

(87) PCT Pub. No.: WO2020/032552
PCT Pub. Date: Feb. 13, 2020

(65) Prior Publication Data
US 2021/0314439 A1    Oct. 7, 2021

(30) Foreign Application Priority Data

Aug. 9, 2018 (KR) .................. 10-2018-0092965

(51) Int. Cl.
*H04M 3/42* (2006.01)
*H04M 1/724* (2021.01)

(52) U.S. Cl.
CPC ....... *H04M 3/42068* (2013.01); *H04M 1/724* (2021.01); *H04M 3/42051* (2013.01)

(58) Field of Classification Search
CPC ............. H04M 3/42068; H04M 1/724; H04M 3/42051; H04M 2201/38; H04M 1/576;
(Continued)

(56) References Cited

U.S. PATENT DOCUMENTS

2015/0111548 A1* 4/2015 Ali .................... H04M 3/42042
455/415
2015/0228249 A1   8/2015 Lee et al.

FOREIGN PATENT DOCUMENTS

KR    1020010077433    8/2001
KR       200303567      2/2003
(Continued)

OTHER PUBLICATIONS

Yamagata, Christina, et al. "Mobile app development and usability research to help dementia and Alzheimer patients." 2013 IEEE Long Island Systems, Applications and Technology Conference (Lisat). IEEE, 2013. (Year: 2013).*

(Continued)

*Primary Examiner* — Sharad Rampuria
(74) *Attorney, Agent, or Firm* — The Farrell Law Firm, P.C.

(57) ABSTRACT

An electronic device according to various embodiments may comprise a communication module, a display, an output device, and a processor, wherein the processor is configured to: in response to the reception of a call signal through the communication module, identify a caller corresponding to the call signal; identify a first photo on the basis of the caller; when the electronic device has been configured to output sound in response to the reception of the call signal, output an incoming call screen generated on the basis of the first photo to at least part of the display, wherein the incoming call screen includes one or more image components, each having at least one display attribute that changes according to a change of the sound characteristics of a ringtone; and
(Continued)

output the ringtone through the output device while outputting the incoming call screen. Various other embodiments are also possible.

14 Claims, 24 Drawing Sheets

(58) Field of Classification Search
CPC ............ H04M 19/04; H04M 2201/34; H04M 2201/36; H04M 3/561; H04M 3/567; H04M 2203/20; H04M 2203/35; H04M 1/57; H04M 1/575; H04M 3/42042; H04M 2207/18; H04M 1/578; H04M 19/041; H04M 19/047
See application file for complete search history.

(56) References Cited

FOREIGN PATENT DOCUMENTS

| KR | 101100152 | 12/2011 |
|----|-----------|---------|
| KR | 101218336 | 1/2013 |
| KR | 1020150095523 | 8/2015 |
| KR | 1020150135591 | 12/2015 |

OTHER PUBLICATIONS

PCT/ISA/210 Search Report issued on PCT/KR2019/009827, dated Dec. 5, 2019, pp. 5.
PCT/ISA/237 Written Opinion issued on PCT/KR2019/009827, dated Dec. 5, 2019, pp. 5.

* cited by examiner

| | | | | |
|---|---|---|---|---|
| | {7,38,68} | {5,30,78} {14,30,75} {8,45,77} {17,47,77} | | 0-19 |
| | | {25,30,72} {35,30,70} {36,40,77} | | 20-39 |
| | {58,35,68} | {45,35,72} {55,40,72} {45,45,78} | | 40-59 |
| | {78,31,68} | {69,37,74} {78,28,70} | | 60-79 |
| | {97,30,68} | {89,30,77} | | 80-99 |
| | {105,24,64} | {103,30,75} | | 100-119 |
| | {128,23,64} {139,30,69} | {135,23,74} {130,32,77} | | 120-139 |
| | {145,22,69} {157,36,69} | {155,24,70} {155,35,74} | | 140-159 |
| | {165,26,69} {175,35,64} | {175,25,70} {162,35,74} {178,35,74} | | 160-179 |
| | {182,35,68} {195,40,68} | {183,35,75} {197,35,75} | | 180-199 |
| | {215,30,68} | {205,35,75} {215,30,78} {218,20,75} | | 200-219 |
| | {225,30,68} | {225,30,75} | | 220-239 |
| | {240,26,68} {255,20,68} | {245,25,70} | | 240-259 |
| | {262,30,68} | {260,25,75} {260,30,70} | | 260-279 |
| | {285,30,65} {297,18,68} | {285,19,70} {295,13,70} | | 280-299 |
| | {319,28,65} {305,20,65} | {310,25,70} {315,23,77} | | 300-319 |
| | {338,30,68} | {325,23,75} {335,29,70} | | 320-339 |
| | {345,30,68} {358,28,68} | {345,35,77} {345,23,70} {357,37,77} {357,25,73} | | 340-360 |

| | | | |
|---|---|---|---|
| {2,30,60}<br>{15,20,20} | {2,50,60}<br>{15,20,20} | 0-9 | H 0 |
| {17,30,65}<br>{35,25,20} | {17,50,65}<br>{35,25,20} | 10-29 | |
| {17,30,65}<br>{35,25,20} | {17,50,65}<br>{35,25,20} | 30-39 | |
| {45,30,60}<br>{75,20,20} | {45,60,60}<br>{75,20,20} | 40-59 | |
| {45,30,60}<br>{75,20,20} | {45,60,60}<br>{75,20,20} | 60-79 | |
| {90,30,50}<br>{105,20,20} | {90,45,50}<br>{105,20,20} | 80-99 | |
| {90,30,50}<br>{105,20,20} | {90,45,50}<br>{105,20,20} | 100-119 | |
| {128,30,50}<br>{150,20,20} | {128,45,50}<br>{150,20,20} | 120-139 | |
| {128,30,50}<br>{150,20,20} | {128,45,50}<br>{150,20,20} | 140-159 | |
| {170,30,50}<br>{190,30,20} | {170,55,50}<br>{190,30,20} | 160-179 | |
| {170,30,50}<br>{190,30,20} | {170,55,50}<br>{190,30,20} | 180-199 | |
| {188,40,55}<br>{221,40,35} | {188,70,55}<br>{221,40,35} | 200-219 | |
| {188,40,55}<br>{221,40,35} | {188,70,55}<br>{221,40,35} | 220-239 | |
| {255,30,50}<br>{275,30,25} | {255,55,50}<br>{275,30,25} | 240-259 | |
| {255,30,50}<br>{275,30,25} | {275,30,25}<br>{275,30,25} | 260-279 | |
| {295,30,50}<br>{315,30,25} | {295,55,50}<br>{315,30,25} | 280-299 | |
| {295,30,50}<br>{315,30,25} | {295,55,50}<br>{315,30,25} | 300-319 | |
| {338,30,53}<br>{355,25,20} | {338,55,53}<br>{355,25,20} | 320-339 | |
| {338,30,53}<br>{355,25,20} | {338,55,53}<br>{355,25,20} | 340-360 | H 360 |
| S 0 | 0-39 | 40-100 | | S 100 |

FIG.14B

ELECTRONIC DEVICE TO WHICH INCOMING CALL SCREEN IS OUTPUT AND METHOD FOR OUTPUTTING INCOMING CALL SCREEN

PRIORITY

This application is a National Phase Entry of PCT International Application No. PCT/KR2019/009827, which was filed on Aug. 6, 2019, and claims priority to Korean Patent Application No. 10-2018-0092965, which was filed on Aug. 9, 2018, the contents of each of which are incorporated herein by reference.

TECHNICAL FIELD

Various embodiments relate to an electronic device for outputting a call reception screen and a method for outputting a call reception screen, and more particularly, to an electronic device for outputting a call reception screen to inform a user of the electronic device of the reception of a call signal in response to the reception of the call signal and a method for outputting a call reception screen to inform a user of an electronic device of the reception of a call signal in response to the reception of the call signal.

BACKGROUND ART

There are in wide use electronic devices capable of receiving and transmitting call signals. Various methods are known for informing a user of an electronic device of the reception of a call signal when the electronic device receives the call signal. The electronic device, for example, may output a call reception screen on the display of the electronic device in order to inform the user of the reception of the call signal when receiving the call signal. Alternatively, the electronic device may output a voice through an output device of the electronic device in order to notify the user of the reception of a call signal when the call signal is received. Alternatively, the electronic device may output a vibration through an output device of the electronic device in order to notify the user of the reception of a call signal when receiving the call signal. The output of voice and/or vibration through the above-described electronic device may occur simultaneously with the operation of outputting a call reception screen on the display of the electronic device.

DETAILED DESCRIPTION OF THE INVENTION

Technical Problem

In the case of outputting a call reception screen on the display of the electronic device when receiving a call signal through a conventional electronic device, a call reception screen set by default or a call reception screen preset by the user is displayed regardless of the caller of the call signal. In this case, use of such a uniform call reception screen that does not reflect the caller's personality of the call signal allows the user of the electronic device to identify the caller of the call signal in the form of text but does not provide intuitive recognition about the caller of the call signal in the form of an illustration. Although a method in which the caller's photo is displayed on the call reception screen has been used, the privacy of the caller may be infringed as the caller's photo is exposed in a relatively large size. Although a method of displaying the caller's photo in a relatively small size has been used, it is difficult for the receiver to intuitively recognize the caller through the small photo.

Further, when a call signal is received through a conventional electronic device, a screen is output on the display of the electronic device and at the same time, a voice or vibration is output through an output device of the electronic device. In this case, a call reception screen set with no relationship with the voice or vibration is output. There is no known configuration of temporally matching the voice or vibration indicating reception of a call signal through audible or tactile sense and the call reception screen visually indicating reception of the call signal. Depending on the user's settings, the electronic device may output various sounds as ringtones, but there is no known method of analyzing the sound specified as the ringtone and changing the call reception screen based on the analysis result.

By an electronic device and a method performed on the electronic device according to various embodiments, a call reception screen may be generated based on a photo identified based on a caller corresponding to a call signal. According to various embodiments, the call reception screen may be changed according to a change in the characteristics of a voice or ringtone indicating reception of a call signal.

Technical Solution

According to various embodiments, an electronic device may comprise a communication module, a display, an output device, and a processor. The processor may be configured to identify a caller corresponding to a call signal in response to reception of the call signal through the communication module, identify a first photo based on the caller, when the electronic device is configured to output a voice in response to reception of the call signal, output a call reception screen generated based on the first photo in at least a portion of the display, the call reception screen including one or more image components having at least one visual property that changes according to a variation in a sound characteristic of a ringtone, and output the ringtone through the output device while outputting the call reception screen.

According to various embodiments, a method performed on an electronic device may comprise identifying a caller, identifying a first photo based on the caller, when the electronic device is configured to output a voice in response to reception of the call signal, outputting a call reception screen generated based on the first photo in at least a portion of the display, the call reception screen including one or more image components having at least one visual property that changes according to a variation in a sound characteristic of a ringtone, and outputting the ringtone through the output device while outputting the call reception screen.

According to various embodiments, an electronic device may comprise a communication module, a display, and a processor. The processor may be configured to identify at least one photo respectively corresponding to at least one caller stored in the electronic device, identify a plurality of section representative colors identified for each of a plurality of sections of each of the at least one photo, obtain a call reception screen corresponding to each of the at least one caller, based on the plurality of identified call reception screens, and display a call reception screen associated with a caller corresponding to a call signal through the display, in response to reception of the call signal through the communication module.

Advantageous Effects

According to various embodiments, a call reception screen may be generated based on a photo identified based on a caller corresponding to a call signal and may be changed according to a change in the characteristics of a voice or ringtone indicating reception of a call signal. Accordingly, the characteristics of a ringtone or vibration pattern selected by the user of the electronic device in addition to the graphical characteristics of a photo representing the personality of the caller corresponding to the call signal may be displayed on the call reception screen. Accordingly, the user of the electronic device may more intuitively recognize who the caller corresponding to the call signal is, and the caller's personality may be reflected on the call reception screen, so that a better notification effect may be achieved. Since the caller's photo is not exposed in a large size and the graphical characteristics of the caller's photo may be displayed on the entire screen, the receiver may intuitively recognize the caller without infringing the caller's privacy.

Further, since the characteristics of the ringtone or vibration pattern are visually displayed on the call reception screen, the visual notification and the notification by the ringtone or vibration pattern are temporally matched so that a better notification effect may be attained.

BRIEF DESCRIPTION OF DRAWINGS

FIG. 12 is a view illustrating operations of an electronic device according to various embodiments;

FIGS. 14A and 14B are views illustrating operations of an electronic device according to various embodiments;

MODE FOR CARRYING OUT THE INVENTION

Figure 1:
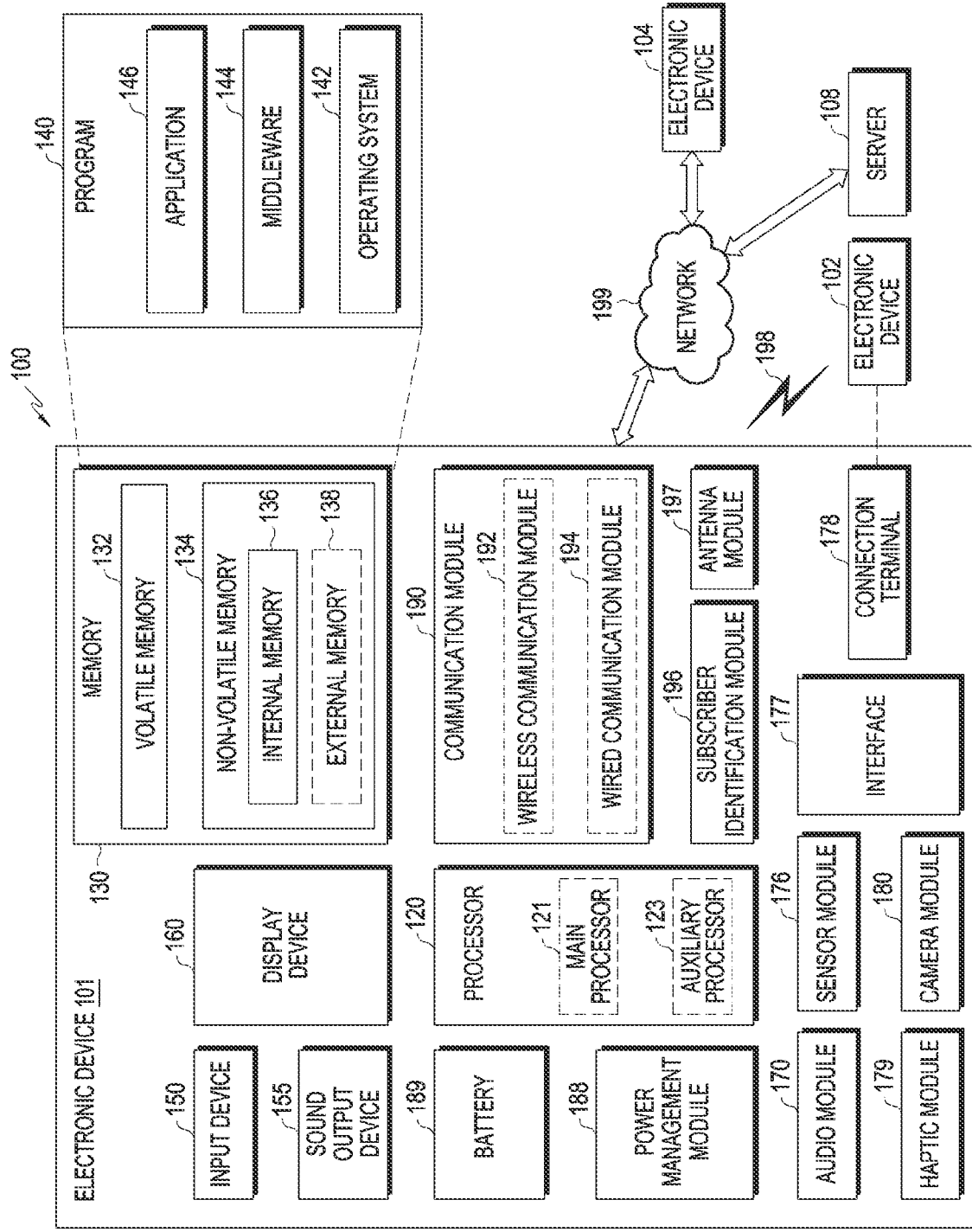
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 1301, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMST)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
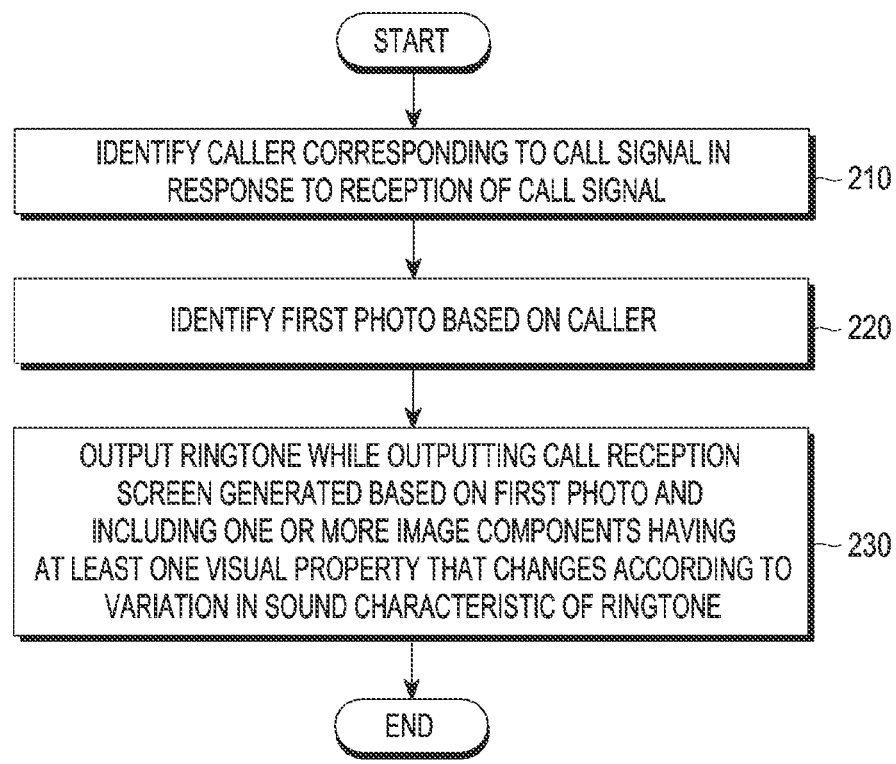
FIG. 2 is a flowchart illustrating operations of an electronic device according to various embodiments.

FIG. 2 is a flowchart illustrating operations of an electronic device according to various embodiments. According to various embodiments, in operation 210, the electronic device 101 (e.g., the processor 120) may identify a caller corresponding to a call signal in response to the reception of the call signal through a second network 199 from an external electronic device (e.g., the electronic device 104). For example, the electronic device 101 may receive a call signal using a voice-only switching network (e.g., a 3G CS circuit switching network), or by a method using a voice data integrated switching network (e.g., an LTE packet switching network) (e.g., voice over long term evolution (LTE). Further, in this disclosure, the call signal may include not only a call signal defined in a communication standard such as LTE, but also a signal including data by an application supporting voice data transmission and reception. Further, the call signal may include not only an audio signal but also a signal including data for a video call.

For example, the electronic device 101 may receive information about the phone number of the electronic device 104 from the electronic device 104 (or a relay device) corresponding to the call signal through the second network 199 and may specify the caller corresponding to the call signal using the phone number. As used herein, "electronic device 101 may perform a particular operation" may be appreciated as the processor 120 performing the particular operation. "Electronic device 101 may perform a particular operation" may also be appreciated as the processor 120 controlling hardware in the electronic device 101 or hardware outside the electronic device 101 to perform the particular operation. Further, "electronic device 101 performs a particular operation" may be appreciated as the memory 130 storing instructions enabling at least one of the processor 120 or hardware to perform the particular operation.

In operation 220, the electronic device 101 may identify a first photo based on the identified caller. According to various embodiments, the electronic device 101 may identify the first photo by referring to the memory 130 of the electronic device 101. For example, when the electronic device 101 receives information about the phone number of the electronic device 104 corresponding to the received call signal through the second network 199, the electronic device 101 may identify whether an address book item including the received phone number of the electronic device 104 is stored in the address book application. When the address book item including the phone number of the electronic device 104 is stored in the address book application, the electronic device may identify whether a photo is included in the address book item including the phone number of the electronic device 104. When it is determined that the photo is included in the address book item including the phone number of the electronic device 104, the photo included in the address book item including the phone number of the electronic device 104 may be identified as a first photo. In another example, when the electronic device 101 receives information about the phone number of the electronic device 104 corresponding to the received call signal through the second network 199, the electronic device 101 may identify whether an address book item including the received phone number is stored in the address book application of the electronic device 101. When the address book item including the phone number of the electronic device 104 is stored in the address book application of the electronic device 101, the electronic device 101 may identify name information from the address book item including the phone number of the electronic device 104. Thereafter, the electronic device 101 may identify whether a photo corresponding to the identified name information exists in the gallery application of the electronic device 101, and if the photo exists, the electronic device 101 may identify that one of the photos including the identified name information as the first photo. For example, the electronic device 101 may store additional information for each photo, and may store identification information (e.g., name information) for the person included in the photo in association with the photo. In another example, when the electronic device 101 receives information about the caller's telephone number corresponding to the received call signal through the second network 199, the electronic device 101 may identify whether the call log including the caller's telephone number exists in the phone application and, if so, the electronic device 101 may identify whether there is stored a photo associated with the call log including the received phone number. When there are stored photos associated with the call log including the received phone number, the electronic device 101 may identify one of the photos associated with the call log including the received phone number as the first photo.

According to various embodiments, as will be described later in more detail with reference to FIG. 3, the electronic device 101 may identify the first photo by receiving the first photo from the server 108 or the electronic device 104 through the second network 199. Further, example methods for identifying the first photo are not mutually exclusive, and therefore, it is possible to use a combination of two or more of the methods for identifying the first photo. For example, the electronic device 101 may first attempt to identify a photo included in the address book item including the caller's phone number as the first photo, and if the first photo may not be identified, e.g., when no photo is included in the address book item including the caller's phone number, the electronic device 101 may identify the name information from the address book item and identify the photo including the identified name information included in the gallery application as the first photo or may identify the first photo by receiving the first photo from the server 108 or the electronic device 104 through the second network 199.

According to various embodiments, when the first photo is unable to be identified despite the attempt to identify the first photo by one or more of the above-described methods, the electronic device 101 may be configured to identify a predesignated lock screen (or standby screen) of the electronic device 101 as the first photo.

In operation 230, the electronic device 101 may output a ringtone while outputting a call reception screen including one or more image components having at least one visual property that is generated based on the first photo and changes depending on a change in the sound characteristic of the ringtone. According to various embodiments, the memory 130 of the electronic device 101 may store an association between each phone number stored in the address book application and various ringtones. That is, the ringtone may be identified corresponding to the caller identified in operation 210. Alternatively, if the association between the ringtone and the caller identified in operation 210 is not stored, the electronic device 101 may output a ringtone set as default or set by the user. The call reception screen may be output through the display device 160 of the electronic device 101. Further, the ringtone may be output through the sound output device 155 of the electronic device 101.

Figure 3:
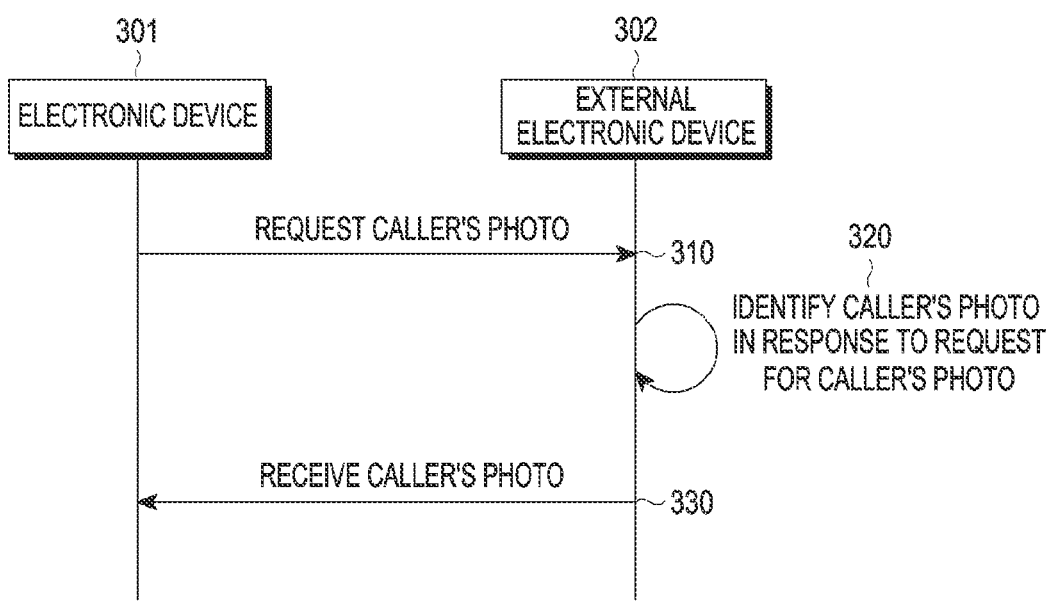
FIG. 3 is a flowchart illustrating operations of an electronic device according to various embodiments.

FIG. 3 is a flowchart illustrating operations of an electronic device according to various embodiments. Specifically, FIG. 3 illustrates an example method for the electronic device 101 to identify the first photo in operation 220 of FIG. 2 and, in connection therewith, an embodiment is described in which the electronic device 101 identifies the first photo by receiving the first photo from the server 108 or the electronic device 104 through the second network 199.

In operation 310, the electronic device 301 (for example, the electronic device 101) may send a request for the caller's photo to an external electronic device 302 (for example, the electronic device 104 or the server 108). The external electronic device 302 may store, e.g., data related to a social network service (SNS). Also, the external electronic device 302 may store data for providing a cloud service to the user of the electronic device 301, for example. According to various embodiments, upon sending a request for the caller's photo to the external electronic device 302, the electronic device 301 may transmit information related to the caller corresponding to the call signal to the external electronic device 302. For example, the electronic device 301 may transmit, to the external electronic device 302, the phone number of the caller corresponding to the call signal, received in connection with reception of the call signal. In another example, the electronic device 301 may search the memory 130 of the electronic device 301 for additional information about the caller corresponding to the call signal using the caller's phone number corresponding to the call signal. For example, the electronic device 301 may transmit information stored in an address book item including the caller's phone number corresponding to the call signal in the address book application to the external electronic device 302. The information related to the caller, transmitted from the electronic device 301 to the external electronic device 302 may be, e.g., any one, or a combination, of the caller's name, email address, phone number, and SNS account corresponding to the call signal.

In operation 320, the external electronic device 302 may identify the caller's photo in response to the request for the caller's photo from the electronic device 301. For example, the external electronic device 302 may search for an SNS account that matches one of the caller's name, email address, phone number, and SNS account, and identify the profile photo of the searched account as the first photo. For example, if the external electronic device 302 searches for an SNS account that matches one of the caller's name, email address, phone number, and SNS account, but no profile photo is set in the searched account, one of the photos related to the searched account may be identified as the first photo. According to various embodiments, the external electronic device 302 may identify the photo associated with the caller's information (e.g., the caller's name), among the photos related to the SNS account of the user of the electronic device 301 from the electronic device 301, as the first photo. According to various embodiments, the external electronic device 302 may identify one of the results in the form of an image searched by a search engine using one or more of the caller's name, email address, phone number, and SNS account as the first photo. According to various embodiments, when the external electronic device 302 stores data for providing a cloud service to a user of the electronic device 301, the external electronic device 302 may identify the photo searched using one or more of the caller's name, email address, phone number, and SNS account among the data stored, as the first photo.

In operation 330, the electronic device 301 may receive the caller's photo identified through operation 320 by the external electronic device 302 from the external electronic device 302.

Figure 4:
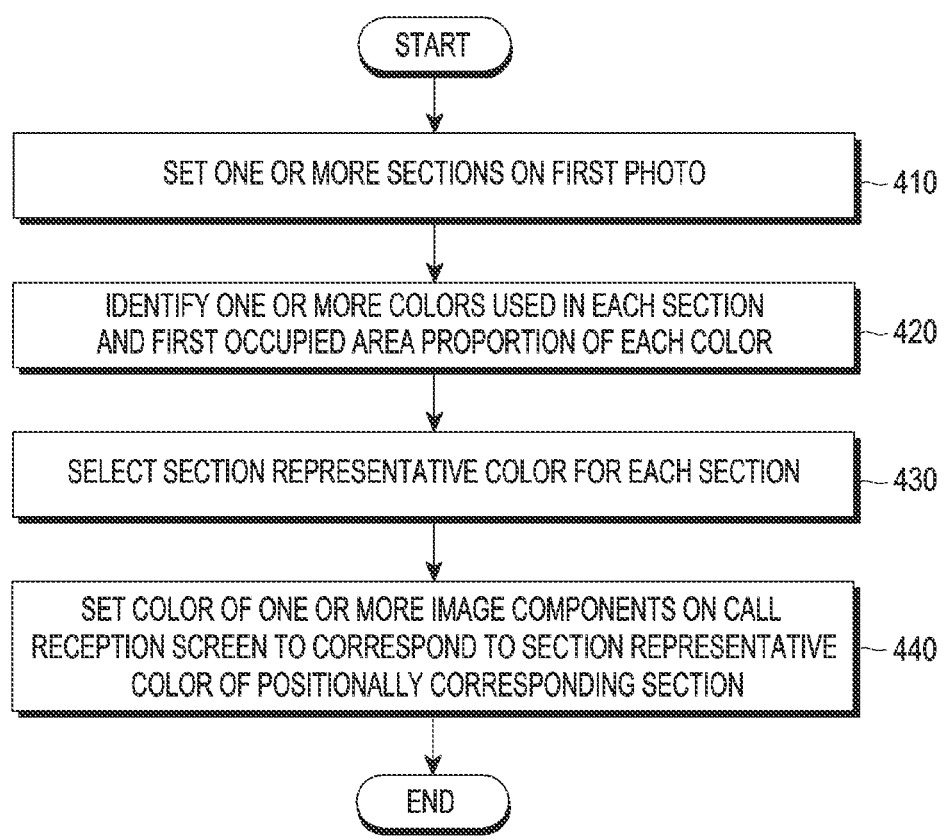
FIG. 4 is a flowchart illustrating operations of an electronic device according to various embodiments.
Figure 5:
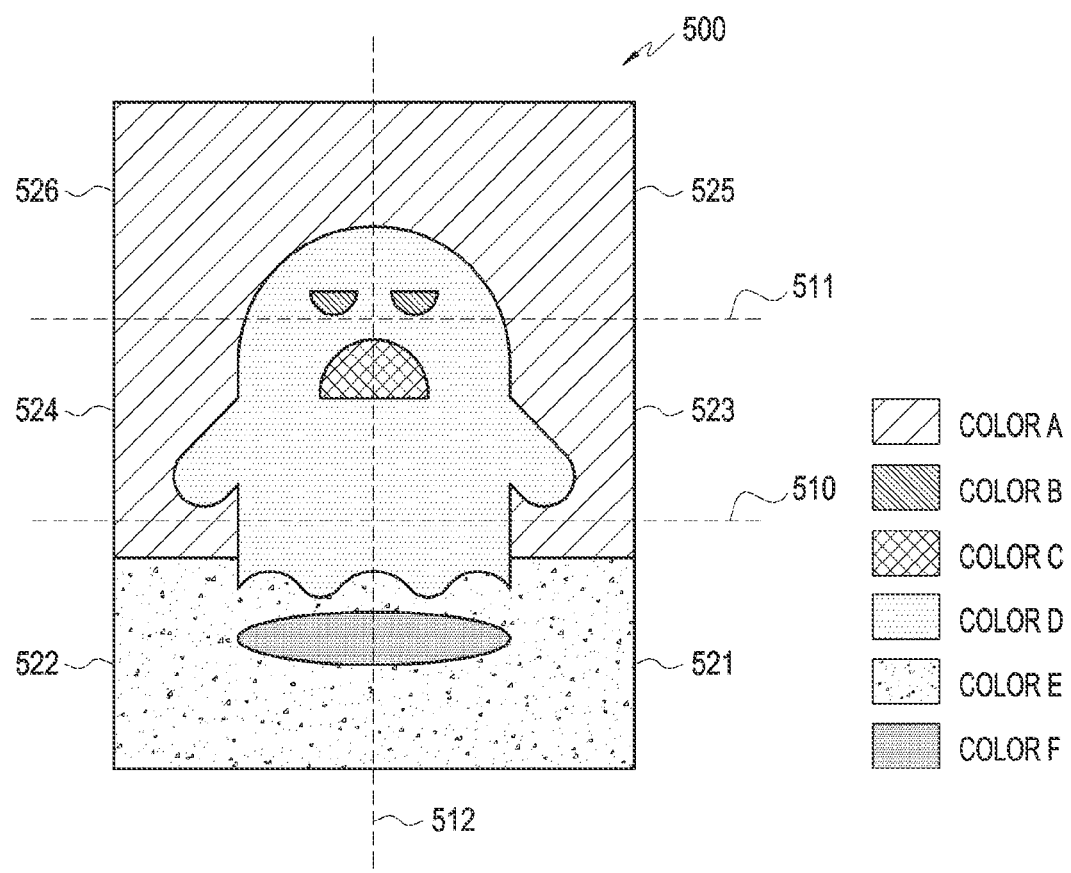
FIG. 5 is a view illustrating operations of an electronic device according to various embodiments.
Figure 6:
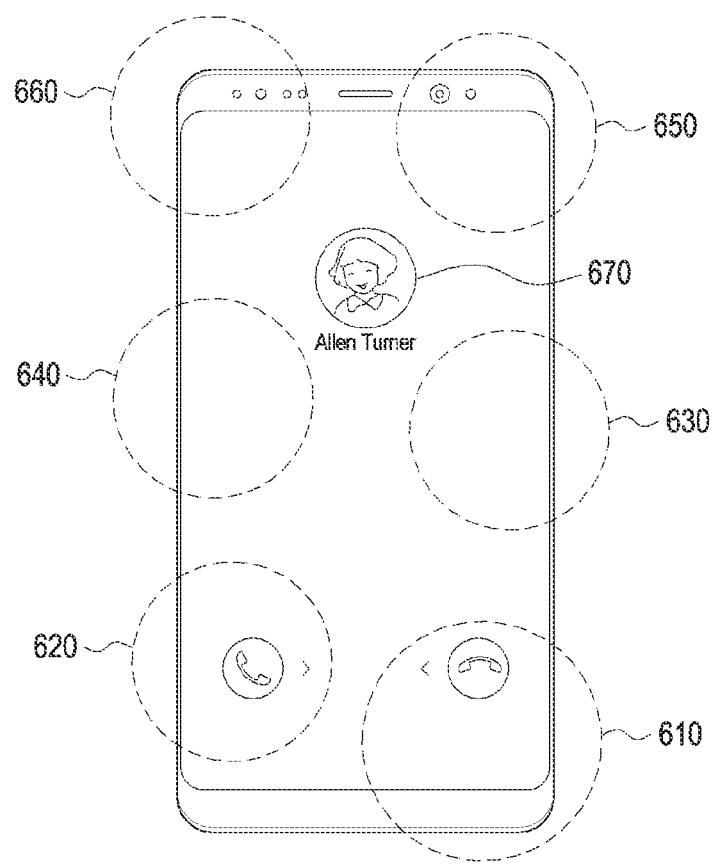
FIG. 6 is a view illustrating a screen displayed by an electronic device according to various embodiments.

FIG. 4 is a flowchart illustrating operations of an electronic device according to various embodiments. Specifically, FIG. 4 is a flowchart illustrating a method of setting a color of an image component of a call reception screen based on a color extracted from the first photo after the first photo is identified. FIG. 5 is a view illustrating an example of the first photo according to various embodiments. FIG. 6 is a view illustrating an example of the call reception screen according to various embodiments.

In operation 410 of FIG. 4, the electronic device 101 (e.g., the processor 120) may set one or more sections in the first photo. For example, referring to FIG. 5, the first photo 500 may be divided into a total of six sections 521, 522, 523, 524, 525, and 526 according to the section lines 510, 511, and 512 on the first photo 500. The number and arrangement of section lines, and the shape and number of sections as shown in FIG. 5 are merely an example, and the sections are not necessarily defined by straight lines. According to various embodiments, the shape and number of sections may be set to differ from those shown in FIG. 5, and are not limited thereto. Further, the section lines are shown merely for illustration purposes, and the electronic device 101 may identify the plurality of sections 521, 522, 523, 524, 525, and 526 based on the range of pixels in the designated photo.

In operation 420 of FIG. 4, the electronic device 101 may identify one or more colors used in each section of the first photo and a first occupied area proportion for each color. In this disclosure, the first occupied area proportion for each color within each section is defined as the proportion of the area occupied by each color included in each section relative to the total area of each section. Referring to FIG. 5 as an example, the electronic device 101 may identify the first occupied area proportion in the section 521 as 75% for color E, 14% for color D, and 10% for color F, the first occupied area proportion in the section 522 as 75% for color E, 14% for color D, and 10% for color F, the first occupied area proportion in the section 523 as 48% for color A, 45% for color D, and 4% for color C, the first occupied area proportion in the section 524 as 48% for color A, 46% for color D, and 4% for color C, the first occupied area proportion in the section 525 as 87% for color A, 10% for color D, and 1% for color B, and the first occupied area proportion in the section 526 as 87% for color A, 10% for color D, and 1% for color B.

Figure 7:
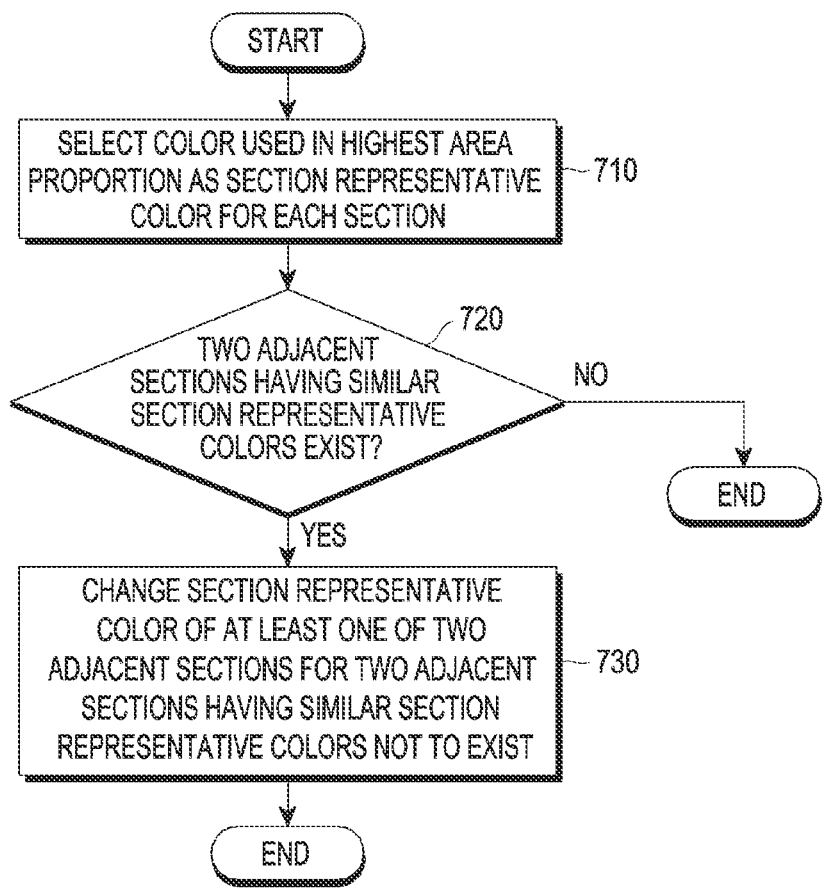
FIG. 7 is a flowchart illustrating operations of an electronic device according to various embodiments.
Figure 8:
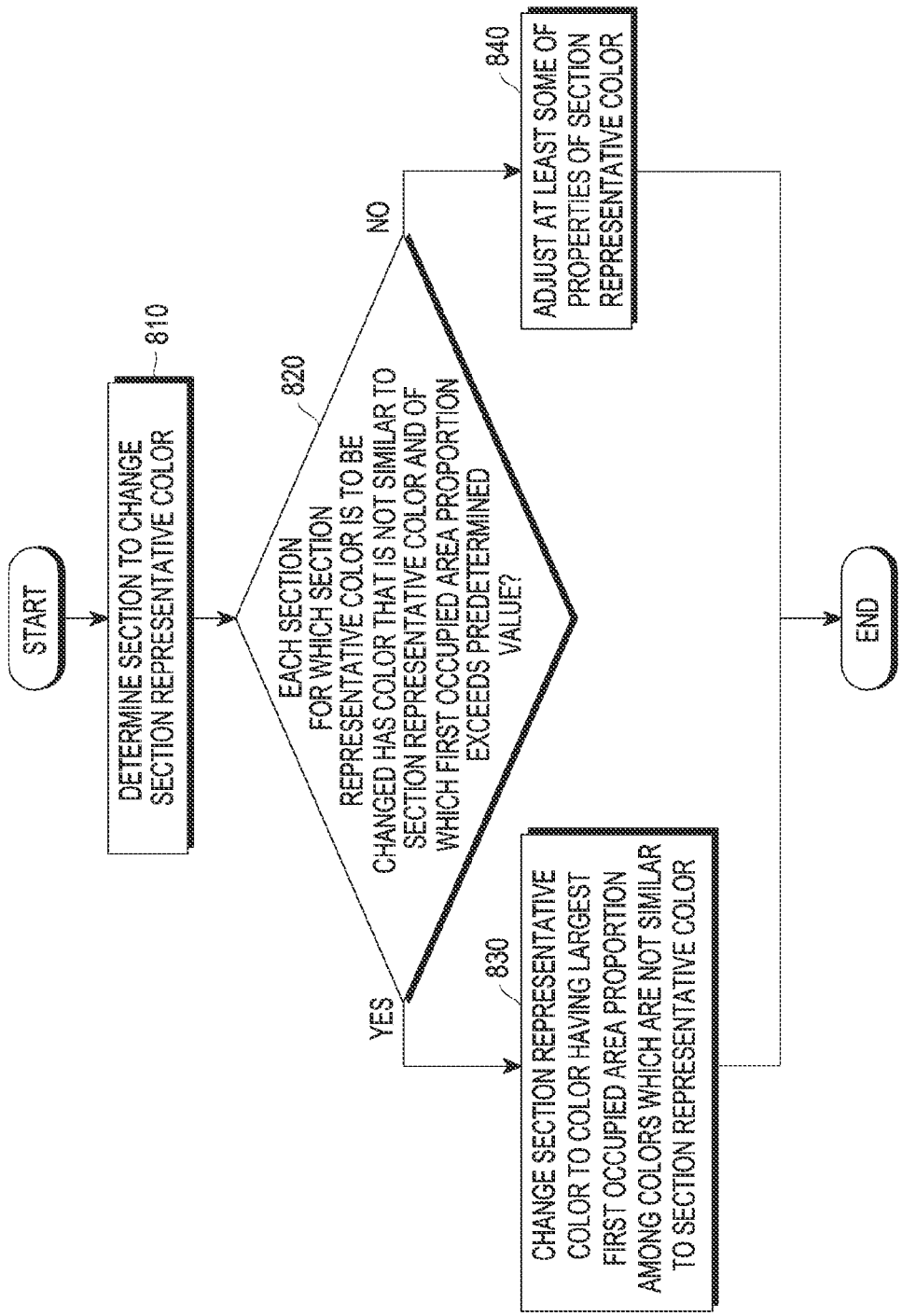
FIG. 8 is a flowchart illustrating operations of an electronic device according to various embodiments.

In operation 430 of FIG. 4, the electronic device 101 may select a section representative color for each section. Referring to FIG. 5 as an example, the electronic device 101 may select, as the representative color, one of colors E, D, and F for the section 521, one of colors E, D, and F for the section 522, one of colors A, D, and C for the section 523, one of the colors A, D, and C for the section 524, one of colors A, D, and B for the section 525, and one of colors A, D, and B for the section 526. An example of a specific method of selecting the section representative color will be described later in detail with reference to FIGS. 7 and 8. However, the method of selecting a section representative color, described later with reference to FIGS. 7 and 8, is merely exemplary, and is not limited to such a specific method. For example, the electronic device 101 may select the color having the highest first occupied area proportion in each section as the representative color of the section. According to various embodiments, the electronic device 101 may select a simple average color of the colors used in each section or a weighted average color in which some or all of the colors used in the first photo have been weighted, as the section representative color. For example, the weight of the weighted average may be based on the first occupied area proportion of the color to be included in the calculation of the weighted average. Further, the electronic device 101 may determine a representative color based on information about not only the corresponding section but also the adjacent section, which will be described in more detail later.

In operation 440 of FIG. 4, the electronic device 101 may set the color of one or more image components on the call reception screen to correspond to the representative color of the section corresponding in position. Referring to FIG. 6 as an example, a call reception screen 600 displayed on the display (e.g., display device 160) of the electronic device 101 may include image components 610, 620, 630, 640, 650, and 660 as well as the first photo 670 identified based on the caller corresponding to the phone number. In the example of FIG. 6, the shape of the image components 610, 620, 630, 640, 650, and 660 is circular, and the boundaries of the image components 610, 620, 630, 640, 650, and 660 may be blurred. In various embodiments, at least part of the image components 610, 620, 630, 640, 650, 660 may be displayed on the display, and portions of the image components 610, 620, 630, 640, 650, and 660 that are out of the display in FIG. 6 may not be displayed. In the present embodiment, at least a portion of each of the image components 610, 620, 630, 640, 650, and 660 is displayed, and the rest thereof is not displayed. However, this is merely exemplary, and the whole of each image component 610, 620, 630, 640, 650, and 660 may be displayed. Referring further to FIG. 5, the electronic device 101 may set the color of the image component 610 to correspond to the representative color of the section 521 that corresponds in position to the image component 610. For example, the electronic device 101 may perform management based on position identification information or the coordinates indicating that the position of the image component 610 is the lowest at the right. The electronic device 101 may determine that the section having the position identification information or coordinates indicating that it is positioned the lowest at the right among the sections of the image corresponds in position to the image component 610. For example, the number of image components and the number of sections may be the same.

As described above, the electronic device 101 may set the color of the image component 620 to correspond to the representative color of the section 522 corresponding in position to the image component 620, the color of the image component 630 to correspond to the representative color of the section 523 corresponding in position to the image component 630, the color of the image component 640 to correspond to the representative color of the section 524 corresponding in position to the image component 640, the color of the image component 650 to correspond to the representative color of the section 525 corresponding in position to the image component 650, and the color of the image component 660 to correspond to the representative color of the section 526 corresponding in position to the image component 660. According to various embodiments, the electronic device 101 may set the color of the image components 610, 620, 630, 640, 650, and 660 to be the same as the representative color of the sections 521, 522, 523, 524, 525, and 526 corresponding in position. Or, according to various embodiments, the electronic device 101 may change one or more of the properties, e.g., brightness, saturation, and hue, of the representative color of the sections 521, 522, 523, 524, 525, and 526 corresponding in position to the image components 610, 620, 630, 640, 650, and 660 according to a predetermined rule and set the changed color as the color of the image components 610, 620, 630, 640, 650, and 660.

According to various embodiments, the electronic device 101 may change display properties of each of the image components 610, 620, 630, 640, 650, and 660 based on a change in the sound characteristics of a ringtone. For example, the electronic device 101 may adjust the size, position, brightness, saturation, hue, transparency, shape of each image component 610, 620, 630, 640, 650, and 660 and, if the image component includes a pattern, the size, position, brightness, saturation, hue, transparency, shape, and density of the pattern, based on the change in the characteristics of the ringtone sound. According to various embodiments, the electronic device 101 may sequentially change display properties of each of the image components 610, 620, 630, 640, 650, and 660. For example, the display properties of each of the image components 610, 620, 630, 640, 650, and 660 may be sequentially changed in association with the output timing of the bit included in the ringtone.

Meanwhile, the call reception screen including the image components as shown in FIG. 6 may be formed and stored previously for each caller. The electronic device 101 may output a call reception screen corresponding to the caller of the call signal, previously stored, along with a ringtone, based on the call signal. Alternatively, the electronic device 101 may form a call reception screen after reception of the call signal, and the timing of formation of the call reception screen is not limited thereto.

FIG. 7 is a flowchart illustrating operations of an electronic device according to various embodiments. Specifically, FIG. 7 is a flowchart for describing a method of determining section representative colors while avoiding determining a similar color as a section representative color in an adjacent section.

In operation 710, the electronic device 101 (e.g., the processor 120) may select the color having the highest first occupied area proportion as the representative color for each section. Referring to FIG. 5 as an example, the electronic device 101 selects color E in the section 521, color E in the section 522, color A in the section 523, and color A in the section 524, as the representative color for each section.

In operation 720, the electronic device 101 may determine whether there are two sections having similar section representative colors. When two colors are similar, this means that, when the two colors are specified with the HSB coordinates, i.e., {hue, saturation, brightness} coordinates, on the HSV color space, the differences in brightness, saturation, and hue, all or at least some, are less than a predetermined level. According to various embodiments, when the difference in brightness between two colors is less than 10, the difference in saturation is less than 10, and the difference in hue is less than 10, the two colors may be defined as similar. Referring to FIG. 5 as an example, the electronic device 101 may determine that the section 521 has a similar representative color to the section 522, and the section 523, the section 524, the section 525, and the section 526 have representative colors similar to each other and that there are two adjacent sections with similar section representative colors. In operation 720, if two adjacent sections with similar section representative colors do not exist, the method ends without adjustment of the section representative colors, and the electronic device 101 may finally identify the color with the highest first occupied area proportion as the representative color for each section. Alternatively, when two adjacent sections having similar section representative colors exist, the electronic device 101 may perform operation 730.

In operation 730, the electronic device 101 may change the section representative color of at least one of the two adjacent sections having similar section representative colors such that there are no two adjacent sections having similar section representative colors. A specific method of changing the section representative color of at least one of the two adjacent sections with similar section representative colors is not limited to a specific one as long as it leads to the result that there are no two adjacent sections with similar section representative colors, and the method described below with reference to FIG. 8 is merely an example.

FIG. 8 is a flowchart illustrating operations of an electronic device according to various embodiments. Specifically, FIG. 8 illustrates an operation for changing the section representative color of at least one of two adjacent sections having similar section representative colors.

In operation 810, the electronic device 101 (e.g., the processor 120) may determine a section to change the section representative color among all the sections in the first photo. The operation of determining the section to change the section representative color may be understood as the operation of selecting one of options defined as a combination of sections to change the section representative color.

When determining the section to change the section representative color, the electronic device 101 may prioritize certain options over the other options according to various criteria. For example, the electronic device 101 may define two adjacent sections having similar section representative colors as one similarity pair and select the option including section belonging to the largest number of similarity pairs, thereby determining the section to change the section representative color. According to this criterion, the option that includes the section belonging to the largest number of similarity pairs takes precedence over the other options that do not.

According to various embodiments, as another example, the electronic device 101 may find all options that result in the absence of two adjacent sections having similar section representative colors and select the option with the smallest number of sections to change the section representative color among the found options, thereby determining the section to change the section representative color. In other words, the electronic device 101 may prioritize the option of minimizing the number of sections for which the section representative color is required to be changed among the options, over the option requiring that the section representative color be changed for relatively more sections. The above-described priority criterion is only presented as an example and is not limited thereto. It is also possible to use a combination of the above-described priority criteria.

According to various embodiments, as another example, when a plurality of options have the same priority according to a predetermined rule, random priority may be added so that an option may be selected according to the additional priority. For example, the additional priority may be set such that it is prioritized to change the representative color of the section which is positioned close to the origin under the assumption that the left edge of the first photo is the y-axis and the lower edge is the x-axis, that is, the lower left vertex of the first photo. In other words, the electronic device 101 may select the option where the position of the section for which the section representative color is to be changed, which is closest to the origin, is closest to the origin, by making comparison as to the position of the section for which the section representative color is to be changed, closest to the origin in each option. Referring to FIG. 5, it has already been described that the representative colors of the sections 521 and 522 are the same as color E. In this case, each option includes the section 522 or the section 521 as a section to change the section representative color. Since the section 522 is closer to the origin than the section 521, the option including the section 522 may have priority over the option including the section 521. Determining the position of the origin as the lower left vertex of the first photo and prioritizing the change of the representative color of the section close to the point in a specific position are examples only, and there is no limitation on the criteria for additional priority.

In operation 820, the electronic device 101 may identify whether there is a color that is not similar to the section representative color and of which the first occupied area proportion exceeds a predetermined value in each section for which the section representative color is to be changed. For example, the predetermined value of the first occupied area proportion may be 10%. In this case, referring to FIG. 5, when the section 522 is determined as one of the sections to change the section representative color, the electronic device 101 may identify whether there is a color which is not similar to the section representative color and of which the first occupied area proportion exceeds the predetermined value for the section 522. As described above with reference to FIG. 4, the first occupied area proportion of each color in the section 522 is 75% for color E, 14% for color D, and 10% for color F. Accordingly, the representative color of the section 522, before the change, is color E, and the first occupied area proportion of color D, which has the highest first occupied area proportion next to color E, is 14%, which is higher than the predetermined value of 10%. Therefore, assuming that color D is not similar to color E, color D is a color that is not similar to the section representative color and of which the first occupied area proportion exceeds the predetermined value. Therefore, the electronic device 101 may identify that, for the section 522, there is a color that is not similar to the section representative color and of which the first occupied area proportion exceeds the predetermined value.

When there is a color that is not similar to the section representative color and of which the first occupied area proportion exceeds the predetermined value, the electronic device 101 may change the section representative color to the color with the highest first occupied area proportion among the colors which are not similar to the section representative color in operation 830. Continuously, in an example in which the section 522 of FIG. 5 is determined to be one of the sections to change the section representative color, and the predetermined first occupied area proportion is 10%, since the first occupied area proportion of color F, which has the highest first occupied area proportion next to color D in the section 522, does not exceed 10%, color D is the only color which is not similar to the section representative color and of which the first occupied area proportion exceeds the predetermined value. Accordingly, the color having the highest first occupied area proportion among colors that are not similar to the section representative color becomes color D, and the electronic device 101 may change the section representative color from color E to color D.

When there is no color that is not similar to the section representative color and of which the first occupied area proportion exceeds the predetermined value, the electronic device 101 may change the section representative color by adjusting at least some of the properties of the section representative color in operation 840. The properties of the section representative color may include brightness, saturation, hue, and transparency of the section representative color. The operation of adjusting at least some of the properties of the section representative color may be, e.g., increasing the brightness value of the HSB coordinates of the section representative color by 20.

Figure 9:
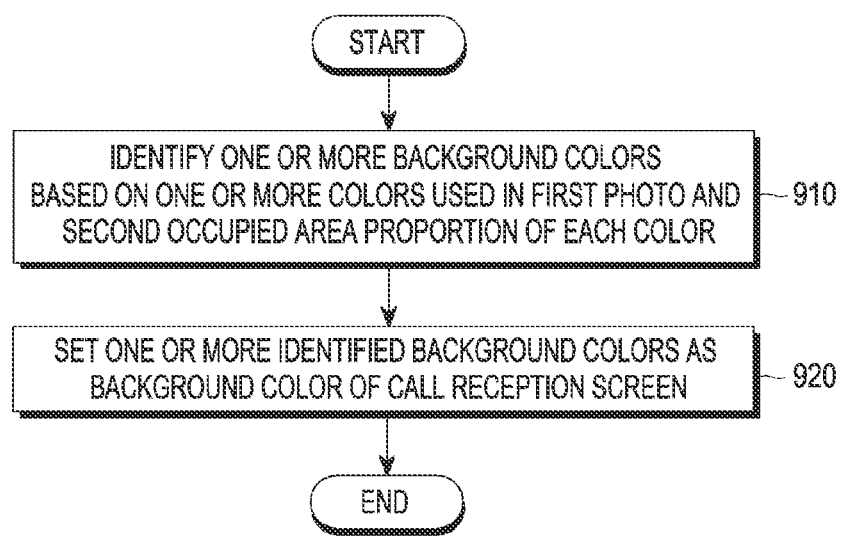
FIG. 9 is a flowchart illustrating operations of an electronic device according to various embodiments.

FIG. 9 is a flowchart illustrating operations of an electronic device according to various embodiments. Specifically, FIG. 9 relates to a method of setting a background color on a call reception screen separately from the image component whose color is set to correspond to the section representative color.

In operation 910, the electronic device 101 (e.g., the processor 120) may identify one or more background colors based on one or more colors used in the first photo and a second occupied area proportion of each color. In this disclosure, the second occupied area proportion for each color is defined as the proportion of the area occupied by each color relative to the total area of the first photo.

Figure 11:
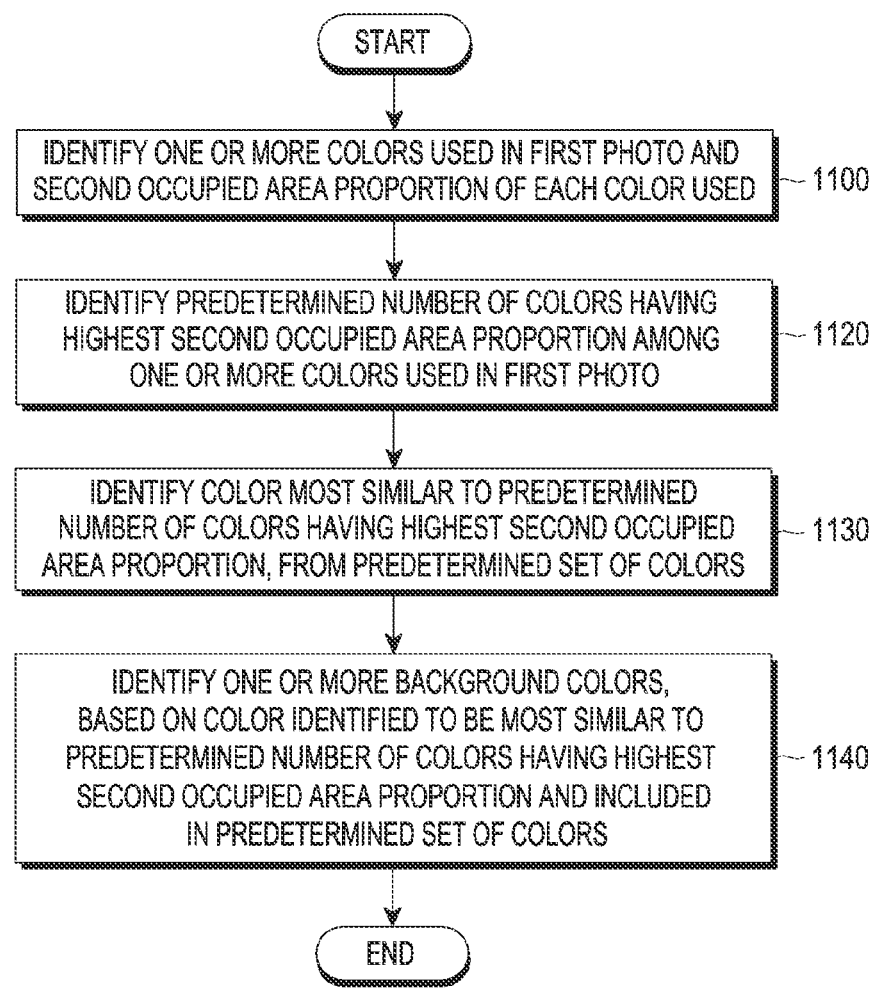
FIG. 11 is a flowchart illustrating operations of an electronic device according to various embodiments.

A specific example method of identifying one or more background colors based on the one or more colors used in the first photo and the second occupied area proportion of each color will be described in detail later with reference to FIG. 11. However, the method of identifying a background color, described later with reference to FIG. 11, is merely exemplary, and is not limited to such a specific method. For example, the electronic device 101 may identify the color having the highest second occupied area proportion among the colors used in the first photo, as the background color. According to various embodiments, the electronic device 101 may identify the color having the highest second occupied area proportion among the colors used in the first photo and the color having the highest second occupied area proportion among the colors which are not similar to the color having the highest second occupied area proportion, as background colors. According to various embodiments, the electronic device 101 may identify a simple average color of some or all of the colors used in the first photo or a weighted average color in which some or all of the colors used in the first photo are weighted as a background color. For example, the weight of the weighted average may be based on the second occupied area proportion of the color to be included in the calculation of the weighted average.

In operation 920, the electronic device 101 may set one or more identified background colors as background colors of the call reception screen. There is no limitation on the manner in which the background color is displayed in the call reception screen as long as one or more identified background colors are displayed in the background on the call reception screen. For example, assuming that the electronic device 101 identifies a plurality of background colors in operation 910, each background color is displayed at random points on the call reception screen, and a gradation which transitions from the color of one point to the color of another point may be displayed in the space between the points. According to various embodiments, the electronic device 101 may set, as the background of the call reception screen, an animation giving the user a feeling as if the background color flows as the point where each background color is displayed and/or the gradation moves over time.

Figure 10:
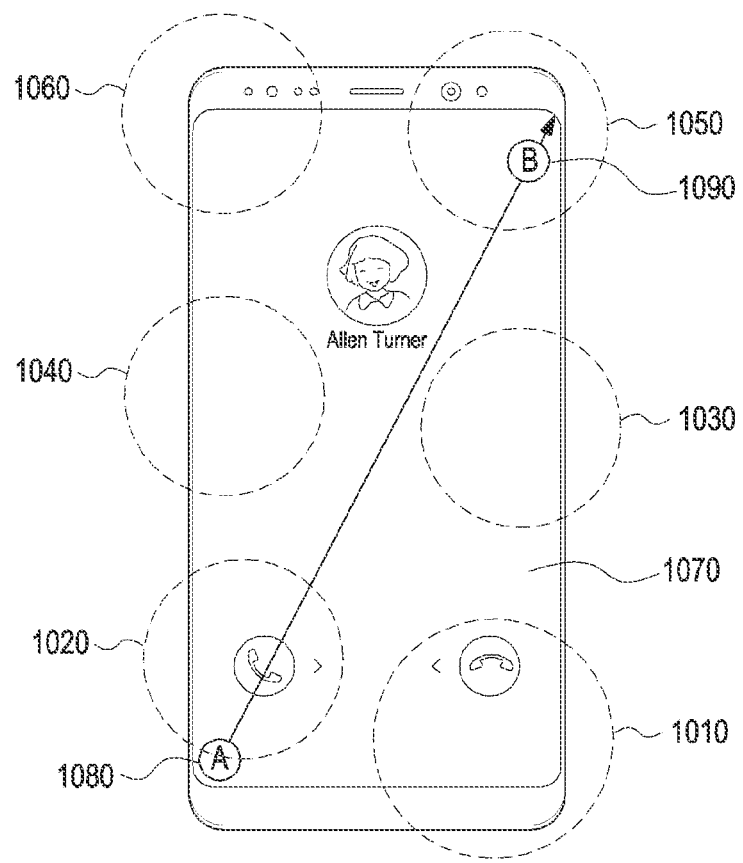
FIG. 10 is a view illustrating a screen displayed by an electronic device according to various embodiments.

Meanwhile, the background screens described in connection with FIGS. 9 and 10 are merely exemplary, and there are no restrictions on the types and formation methods of the background screens.

FIG. 10 is a view illustrating a screen displayed by an electronic device according to various embodiments. Specifically, FIG. 10 illustrates an example call reception screen as described with reference to FIG. 9. According to various embodiments, a total of two background colors, background color A 1080 and background color B 1090, may be displayed as the background colors of the call reception screen 1070 displayed on the display (e.g., the display device 160) of the electronic device 101. In the space between the point where the background color A 1080 is displayed and the point where the background color B 1090 is displayed, a gradation transitioning from the background color A 1080 to the background color B 1090 may be displayed. Image components 1010, 1020, 1030, 1040, 1050, and 1060 may be displayed on the background of the background color A 1080 and the background color B 1090.

FIG. 11 is a flowchart illustrating operations of an electronic device according to various embodiments. Specifically, FIG. 11 illustrates a specific example method of identifying one or more background colors based on the one or more colors used in the first photo and the second occupied area proportion of each color.

In operation 1110, the electronic device 101 (e.g., the processor 120) may identify one or more colors used in the first photo and the second occupied area proportion of each color.

In operation 1120, the electronic device 101 may identify a predetermined number of colors having the highest second occupied area proportion among the one or more colors used in the first photo. For example, the predetermined number may be two. In this case, the electronic device 101 may identify the color having the highest second occupied area proportion among the one or more colors used in the first photo and the color having the second highest second occupied area proportion.

In operation 1130, the electronic device 101 may identify a color which is most similar to the predetermined number of colors having the highest second occupied area proportion from a predetermined set of colors. The predetermined set of colors may be, e.g., a set of colors shown in FIG. 12. According to various embodiments, the predetermined set of colors may be determined such that any combination of colors included in the set does not cause aesthetic discomfort to the user. For example, the predetermined set of colors may be determined so that when any two colors included in the set are selected, the selected two colors do not have a complementary color relationship with each other. As another example, the predetermined color set may be determined such that when any two colors included in the set are selected, a difference in brightness and/or saturation between the two selected colors does not exceed a predetermined level. According to various embodiments, the predetermined set of colors may be determined to include one or more pastel colors. According to various embodiments, a color most similar to a specific color may be defined as a color having the smallest simple sum of differences in hue, saturation, and brightness from the specific color. According to various embodiments, the color most similar to the specific color may be defined as a color having the smallest weighted sum in which a weight has been given to differences in hue, saturation, and brightness from the specific color.

In operation 1140, the electronic device 101 may identify one or more background colors based on the color included in the predetermined color set, which is identified to be most similar to the predetermined number of colors having the highest second occupied area proportion. According to various embodiments, the electronic device 101 may identify, as a background color, the color included in the predetermined color set, which is identified to be most similar to the predetermined number of colors having the highest second occupied area proportion.

FIG. 12 illustrates an example of the predetermined color set for identifying the background color. In the example shown in FIG. 12, the predetermined color set may include a total of 65 predetermined colors. Each predetermined color may be specified with a value of {hue, saturation, brightness} and may have a value within a range from 0 to 360 for hue, a value within a range from 0 to 100 for saturation, and a value with a range from 0 to 100 for brightness. FIG. 12 illustrates the brightness range along the horizontal axis and the hue range along the vertical axis of FIG. 12 and at the fifth column from the left, and each predetermined color is displayed in the position according to the corresponding hue and brightness ranges. The predetermined set of colors shown in FIG. 12 has been determined such that any combination of colors included in the set does not cause aesthetic discomfort to the user. The predetermined set of colors shown in FIG. 12 has been determined so that when any two colors included in the set are selected, the selected two colors do not have a complementary color relationship with each other. The predetermined color set shown in FIG. 12 has been determined such that when any two colors included in the set are selected, a difference in brightness and/or saturation between the two selected colors does not exceed a predetermined level.

Figure 13A:
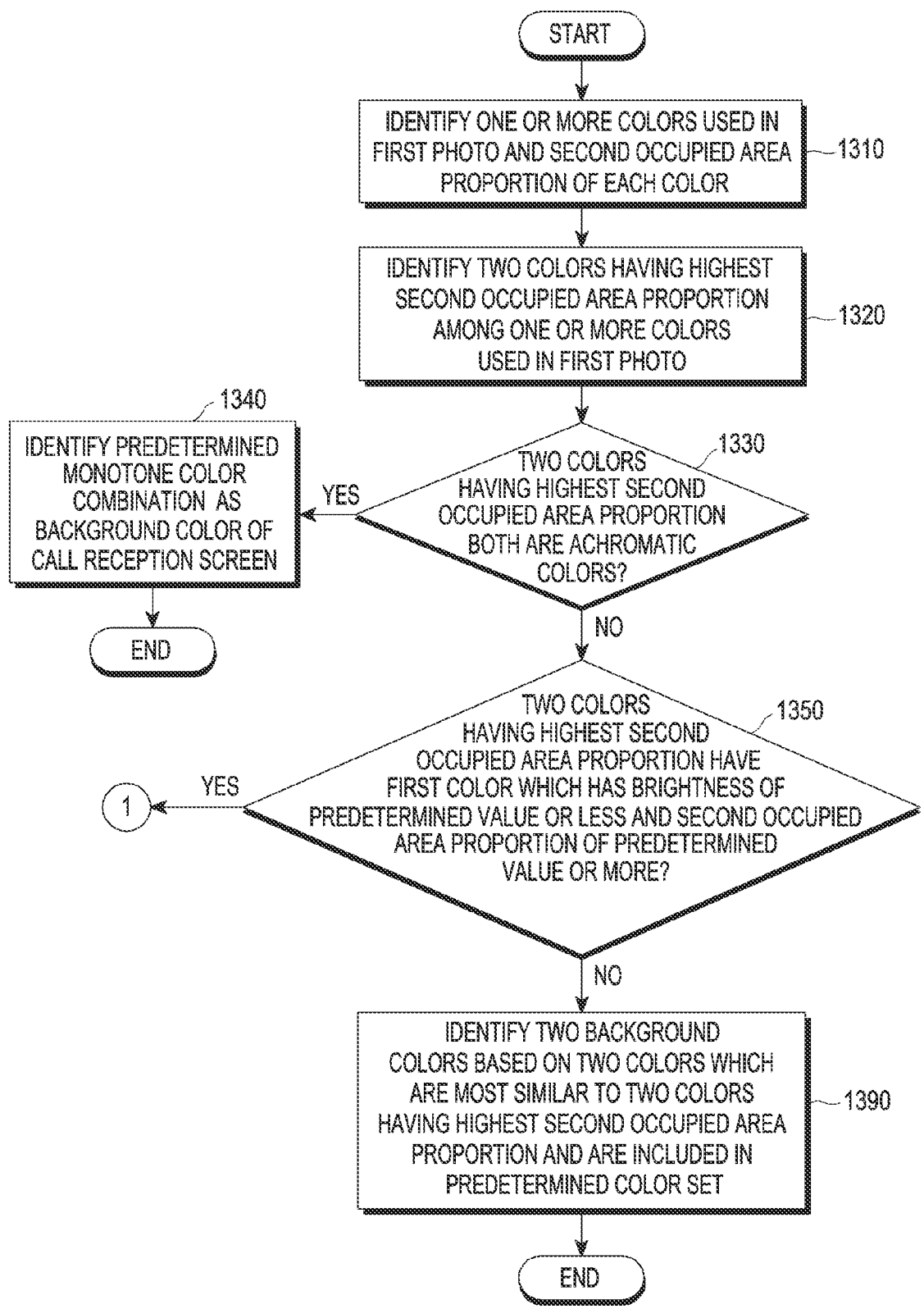
FIGS. 13A and 13B are flowcharts illustrating operations of an electronic device according to various embodiments.
Figure 13B:
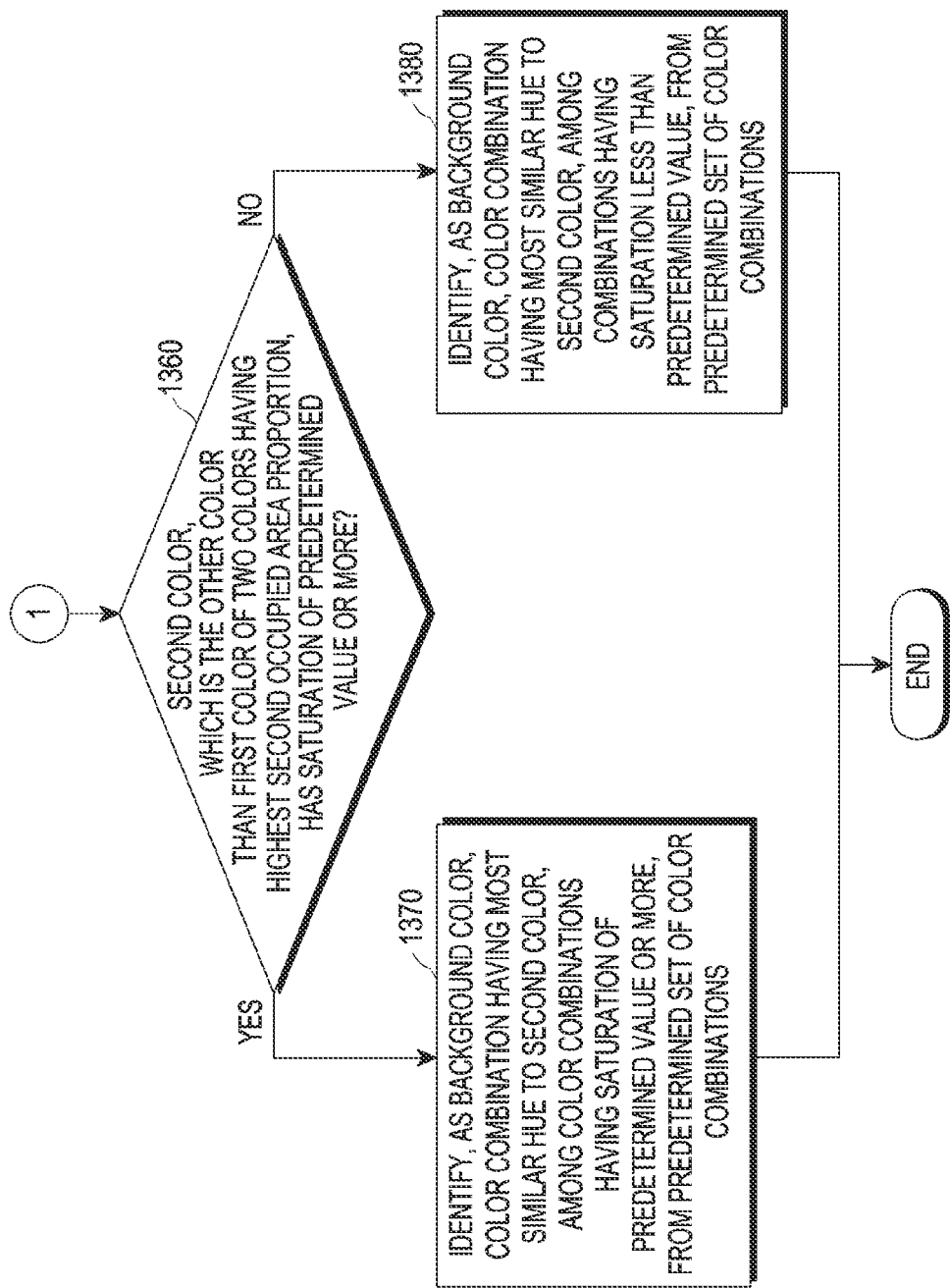
Figure 14A:
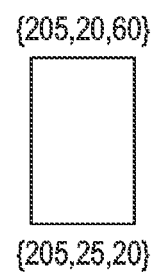

FIGS. 13A and 13B are flowcharts illustrating operations of an electronic device according to various embodiments. Specifically, FIGS. 13A and 13B are flowcharts illustrating an example method for identifying two background colors. FIG. 14A illustrates a predetermined monotone color combination for use in the example method shown in FIGS. 13A and 13B, and FIG. 14B illustrates a predetermined color combination set for use in the example method shown in FIGS. 13A and 13B.

In operation 1310 of FIG. 13A, the electronic device 101 (e.g., the processor 120) may identify one or more colors used in the first photo and the second occupied area proportion of each color. In operation 1320 of FIG. 13A, the electronic device 101 may identify two colors having the highest second occupied area proportion among the one or more colors used in the first photo.

In operation 1330 of FIG. 13A, the electronic device 101 may identify whether the two colors having the highest second occupied area proportion are achromatic colors. When both the colors having the highest second occupied area proportion are achromatic colors, in operation 1340 of FIG. 13A, the electronic device may identify a predetermined monotone color combination as the background color of the call reception screen. According to various embodiments, the predetermined monotone color combination may be the color combination illustrated in FIG. 14A. As shown in FIG. 14A, the example color combination may be specified by two colors for which the HSB coordinates, i.e., {hue, saturation, brightness}, are represented as {205, 20, 60} and {205, 25, 20}, include two colors for which {hue, saturation, brightness} is represented as {205, 20, 60} and {205, 25, 20}. The two colors of {205, 20, 60} and {205, 25, 20} may be displayed at both ends, and the space between the ends may be a gradation of colors gradually transitioning from {205, 20, 60} to {205, 25, 20}. The predetermined monotone color combination illustrated in FIG. 14A is merely an example, and the predetermined monotone color combination may be any combination of colors having the same hue.

When neither of the colors having the highest second occupied area proportion is an achromatic color, in operation 1350 of FIG. 13A, the electronic device 101 may identify whether there is a first color having a brightness value not more than a predetermined value and a second occupied area proportion not less than a predetermined value, of the two colors having the second occupied area proportion. For example, the electronic device 101 may identify whether a color having a brightness of 20 or less and a second occupied area proportion of 10% or more is included in the two colors having the highest second occupied area proportion. The predetermined brightness value and the predetermined second occupied area proportion may be set as arbitrary values.

When the first color is present, in operation 1360 of FIG. 13B, the electronic device 101 may identify whether the saturation of the second color, which is the other color than the first color among the two colors having the highest second occupied area proportion is equal to or greater than a predetermined value. For example, the electronic device 101 may identify whether the saturation of the second color is 40 or more.

When the saturation of the second color is greater than or equal to the predetermined value, in operation 1370 of FIG. 13B, the electronic device may identify, as the background color, a color combination most similar to the hue of the second color among the color combinations having a saturation of a predetermined value or more, from a predetermined color combination set. The predetermined color combination set may be, e.g., a set of the color combinations shown in FIG. 14B. The horizontal axis of FIG. 14B shows the saturation range in the HSV color space, and the vertical axis of FIG. 14B and the third column from the left show the hue range. One color combination is shown in each cell in the first and second columns from the left of FIG. 14B, and each predetermined color combination is defined with two colors represented with HSB coordinates, i.e., {hue, saturation, brightness}. Each predetermined color combination is shown in the position according to the corresponding hue and saturation ranges. As shown in FIG. 14B, each predetermined color combination includes two colors represented with HSB coordinates, that is, {hue, saturation, brightness}, and the two colors represented with HSB coordinates are shown at both ends, and the space between the two ends may be a color gradient that gradually transitions from one of the two colors represented with HSB coordinates to the other. In the case of using the predetermined set of color combinations shown in FIG. 14B, the electronic device 101 may identify whether the saturation of the second color is 40 or more in operation 1360 of FIG. 13B and, when it is identified that the saturation of the second color is 40 or more, the electronic device 101 may identify, as the background color, the color combination having the most similar hue to the second color among the color combinations having a saturation of 40 or more, from the predetermined color combination set.

When the saturation of the second color is less than the predetermined value, in operation 1380 of FIG. 13B, the electronic device 101 may identify, as the background color, a color combination most similar to the hue of the second color among the color combinations having a saturation less than the predetermined value, from a predetermined color combination set. According to various embodiments, in the case of using the predetermined set of color combinations shown in FIG. 14B, when it is identified in operation 1360 of FIG. 13B that the saturation of the second color is less than 40, the electronic device 101 may identify, as the background color, the color combination having the most similar hue to the second color among the color combinations having a saturation less than 40, from the predetermined color combination set.

When neither of the two colors with the highest second occupied area proportion is an achromatic color, and the first color having a hue of a predetermined value or less and a second occupied area proportion of a predetermined value or more is not included in the two colors having the highest second occupied area proportion, in operation 1390 of FIG. 13A, the electronic device 101 may identify two background colors based on two colors most similar to the two colors having the highest second occupied area proportion included in the predetermined color set. The predetermined color set is the same as what has bene described with reference to operation 1130 of FIG. 11, and the process of identifying two background colors based on two colors most similar to the two colors having the highest second occupied area proportion is similar to what has been described in connection with operation 1140 of FIG. Thus, no duplicate description is given below.

Figure 15A:
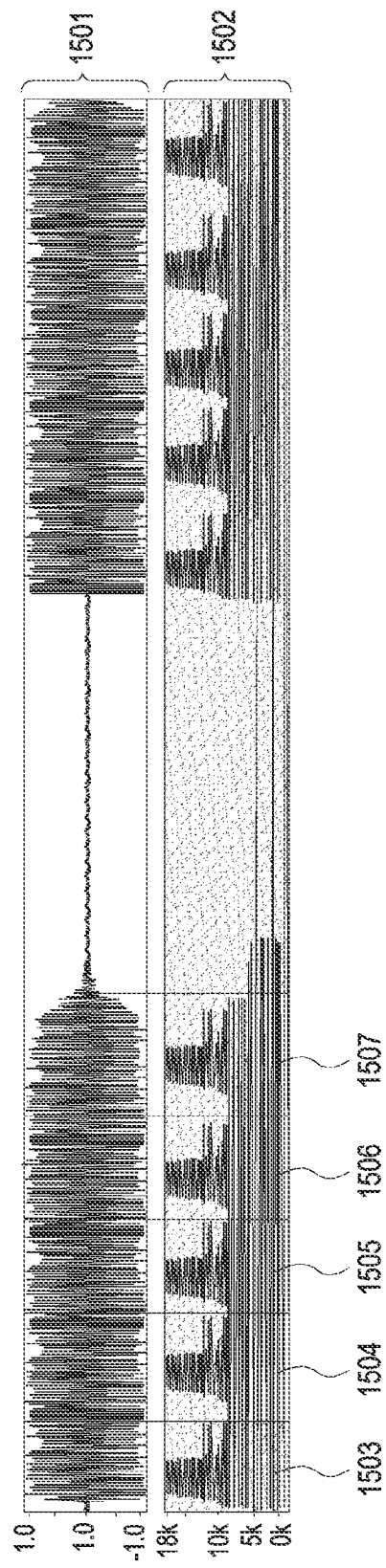
FIGS. 15A and 15B are views illustrating operations of an electronic device according to various embodiments.
Figure 15B:
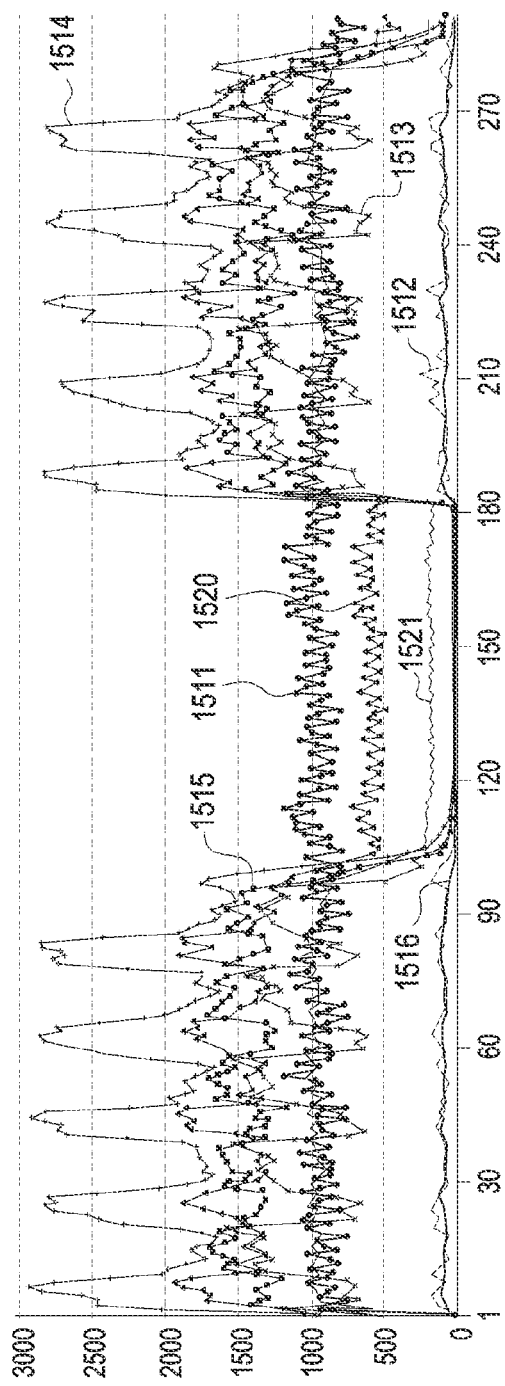

FIGS. 15A and 15B are views illustrating operations of an electronic device according to various embodiments. Specifically, sound analysis for an example ringtone for generating a call reception screen so that at least one visual property of one or more image components changes according to a change in the sound characteristic of the ringtone is described with reference to FIGS. 15A and 15B.

FIG. 15A illustrates a result 1502 of performing a Short Time Fourier Transform (STFT) on an example ringtone waveform 1501 by the electronic device 101 (e.g., the processor 120). The electronic device 101 may calculate a root mean square (rms) value for each of a plurality of predetermined frequency bands using the result 1502 of performing a short time Fourier transform (STFT). The STFT may be performed using, e.g., a hamming window having a size of 1024 ms and an offset of 256 ms. The plurality of predetermined frequency bands may be, e.g., six frequency bands, such as 20 Hz to 250 Hz, 250 Hz to 600 Hz, 600 Hz to 2000 Hz, 2000 Hz to 4000 Hz, 4000 Hz to 6000 Hz, ands 6000 Hz to 20000 Hz. In FIG. 15B, the rms value 1511 for the 20 Hz to 250 Hz band of the example ringtone, the rms value 1512 for the 250 Hz to 600 Hz band, the rms value 1513 for the 600 Hz to 2000 Hz band, the rms value 1514 for the 2000 Hz to 4000 Hz band, the rms value 1515 for the 4000 Hz to 6000 Hz band, and the rms value 1516 for the 6000 Hz to 20000 Hz band are plotted along the horizontal time axis.

According to various embodiments, the electronic device 101 may calculate a weighted average of rms values for the plurality of preset frequency bands. For example, the electronic device 101 may calculate the weighted average 1520 of the rms value 1511 for a band ranging from 20 Hz to 250 Hz, the rms value 1512 for a band ranging from 250 Hz to 600 Hz, then rms value 1513 for a band ranging from 600 Hz to 2000 Hz, the rms value 1514 for a band ranging from 2000 Hz to 4000 Hz, the rms value 1515 for a band ranging from 4000 Hz to 6000 Hz, and the rms value 1516 for a band ranging from 6000 Hz to 20000 Hz. According to various embodiments, in calculating the weighted average 1520 of the rms values for the plurality of preset frequency bands, the weight may be set to 0 for the rms values which are less than the simple average 1521 of the rms values for the plurality of frequency bands among the rms values for the plurality of preset frequency bands. A simplified masking effect may be considered in the calculation of the weighted average 1520 by setting the weight to 0 for the rms values that is less than the simple average 1521 of the rms values for the plurality of frequency bands.

According to various embodiments, the electronic device 101 may divide the ringtone into a plurality of temporal portions based on the fluctuations, over time, of the weighted average. Referring back to FIG. 15A, the electronic device 101 may divide the ringtone into a plurality of temporal portions, such as a first temporal portion 1503, a second temporal portion 1504, a third temporal portion 1505, a fourth temporal portion 1506, and a fifth temporal portion 1507, based on the fluctuations of the weighted average 1520.

The electronic device 101 may associate the plurality of temporal portions with one or more image components, respectively. According to various embodiments, the electronic device 101 may sequentially match one or more image components to the plurality of temporal portions. For example, further referring to FIG. 10, the electronic device 101 may match the first temporal portion 1503 of the ringtone to the image component 1010, the second temporal portion 1504 to the image component 1020, the third temporal portion 1505 to the image component 1030, the fourth temporal portion 1506 to the image component 1040, and the fifth temporal portion 1507 to the image component 1050. When the matching of one or more image components is completed, the electronic device 101 may circulate one or more image components and associate them with the plurality of temporal portions, respectively. For example, the electronic device 101 may associate a sixth temporal portion (not shown), which is next in order to the fifth temporal portion 1507, to the image component 1060, and a seventh temporal portion (not shown), which is next in order to the sixth temporal portion, to the image component 1010.

The electronic device 101 may generate a call reception screen such that the display properties of one or more image components respectively corresponding to the plurality of temporal portions change according to the fluctuation of the weighted average 1520. The display properties of the image components are not limited as long as they are visually displayed properties of the image components. For example, the display properties of the image components may include the size, position, brightness, saturation, hue, transparency, and shape of the image component. Further, when the image component includes a pattern, the size, position, brightness, saturation, hue, transparency, shape, and density of the pattern may be included in the display properties of the image component. According to various embodiments, the electronic device 101 may generate a call reception screen so that the size of the image component changes according to the fluctuation of the weighted average 1520. In this case, referring to FIGS. 10, 15A, and 15B as examples, when the electronic device matches the first temporal portion 1503 to the image component 1010, the electronic device may generate a call reception screen so that the size of the image component 1010 increases when the weighted average 1520 increases and the size of the image component 1010 decrease when the weighted average 1520 decreases during the first temporal portion 1503.

The method for generating a call reception screen so that at least one visual property of one or more image components changes according to the change in the sound characteristics of the ringtone is not limited to associating the visual property of the image component to the fluctuation of the rms value obtained by performing a short time Fourier transform (STFT). According to various embodiments, the electronic device 101 may calculate an average of rms values for a plurality of predetermined frequency bands of a ringtone, divide the ringtone into a plurality of temporal portions based on the fluctuations over time of the average of the rms values, associate the plurality of temporal portions to one or more image components, respectively, and generate a call reception screen so that the display properties of one or more image components respectively corresponding to the plurality of temporal portions change according to the fluctuation, over time, of the average of the rms values. For example, FIG. 15B illustrates an average 1521 of rms values for the plurality of frequency bands of the ringtone 1501 of FIG. 15A. The operation of calculating the average of the rms values for the plurality of frequency bands does not necessarily require a short-time Fourier transform. According to various embodiments, the electronic device may calculate an average of rms values for a plurality of frequency bands using Parseval's theorem.

According to various embodiments, when a plurality of temporal portions are defined, the electronic device 101 may calculate a temporal average of audio volumes for each of the plurality of temporal portions and generate a call reception screen so that the display properties of one or more image components respectively corresponding to the plurality of temporal portions change according to the temporal average of the audio volumes. For example, the electronic device 101 may change the transparency of the corresponding image component according to the temporal average of the audio volumes in each of the plurality of temporal portions. Specifically, the electronic device 101 may generate a call reception screen so that the transparency of the image component decreases as the temporal average of the audio volumes increases.

Figure 16A:
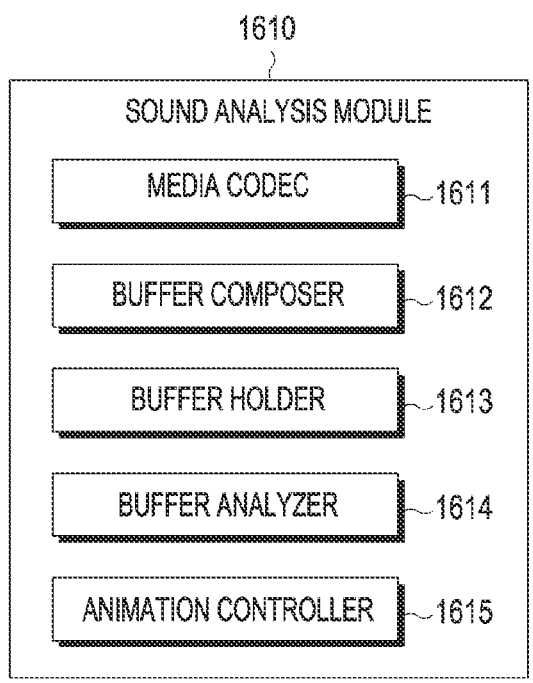
FIG. 16A is a block diagram illustrating a sound analysis module included in an electronic device according to various embodiments.

FIG. 16A is a block diagram illustrating a sound analysis module included in an electronic device according to various embodiments. A sound analysis module 1610 included in the electronic device 101 includes a media codec 1611, a buffer composer 1612, a buffer holder 1613, a buffer analyzer 1614, and an animation controller 1615.

Figure 16B:
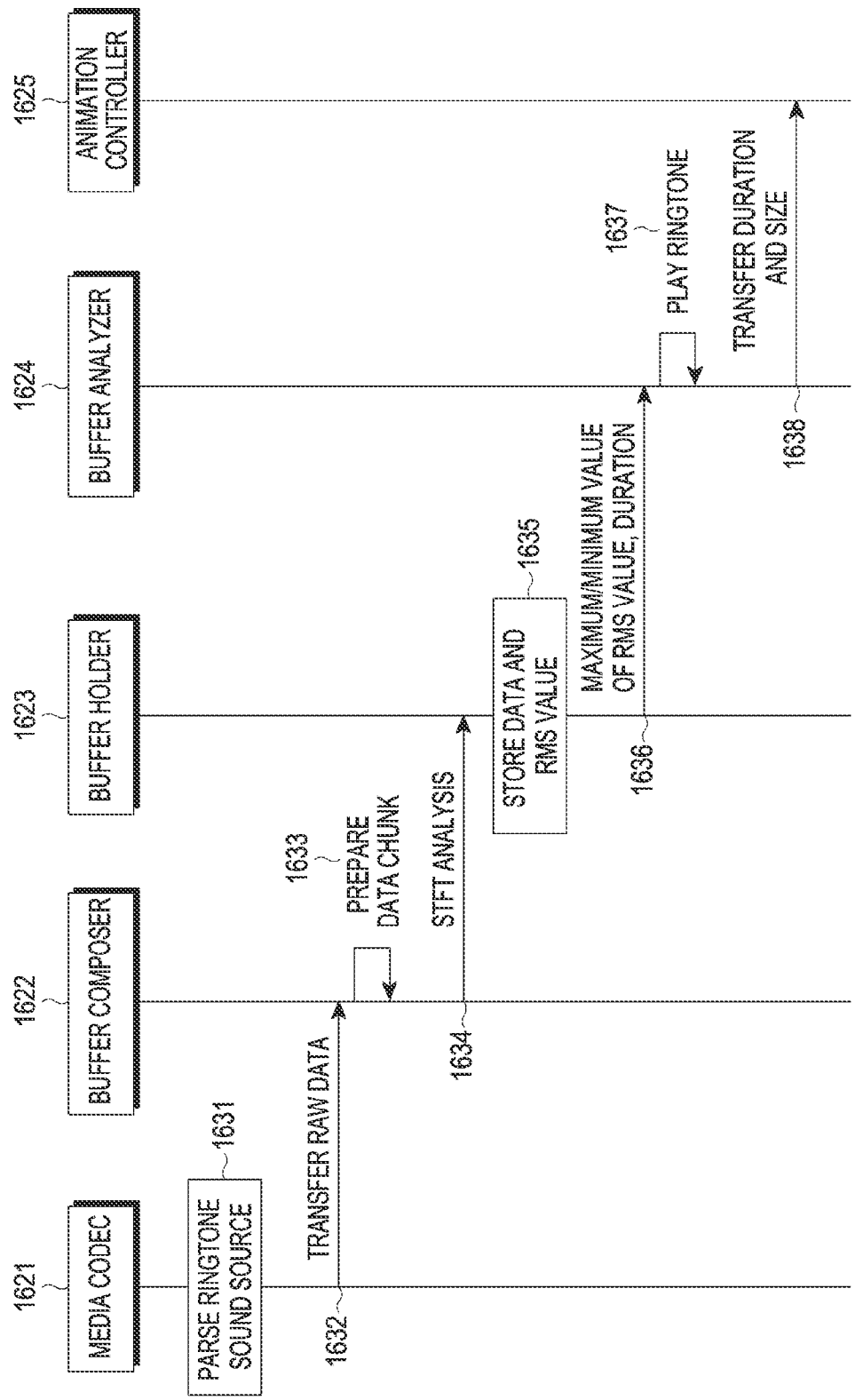
FIG. 16B is a view illustrating operations of a sound analysis module included in an electronic device according to various embodiments.

FIG. 16B is a view illustrating operations of a sound analysis module included in an electronic device according to various embodiments. The media codec 1621 may parse a ringtone sound source (1631) and may transmit raw data to the buffer composer 1622 (1632). The buffer composer 1622 may prepare a data chunk (1633), perform STFT analysis and transfer a result of the analysis to the buffer holder 1623 (1634). The buffer holder 1623 may store the STFT analysis data and the rms value (1635) and may transfer the maximum, minimum, and duration of temporal portion of the rms value to the buffer analyzer 1624 (1636). The buffer analyzer 1624 may play the ringtone (1637) and transfer the duration of temporal portion and the magnitude of rms value in the temporal portion to the animation controller 1625 (1638).

Figure 17:
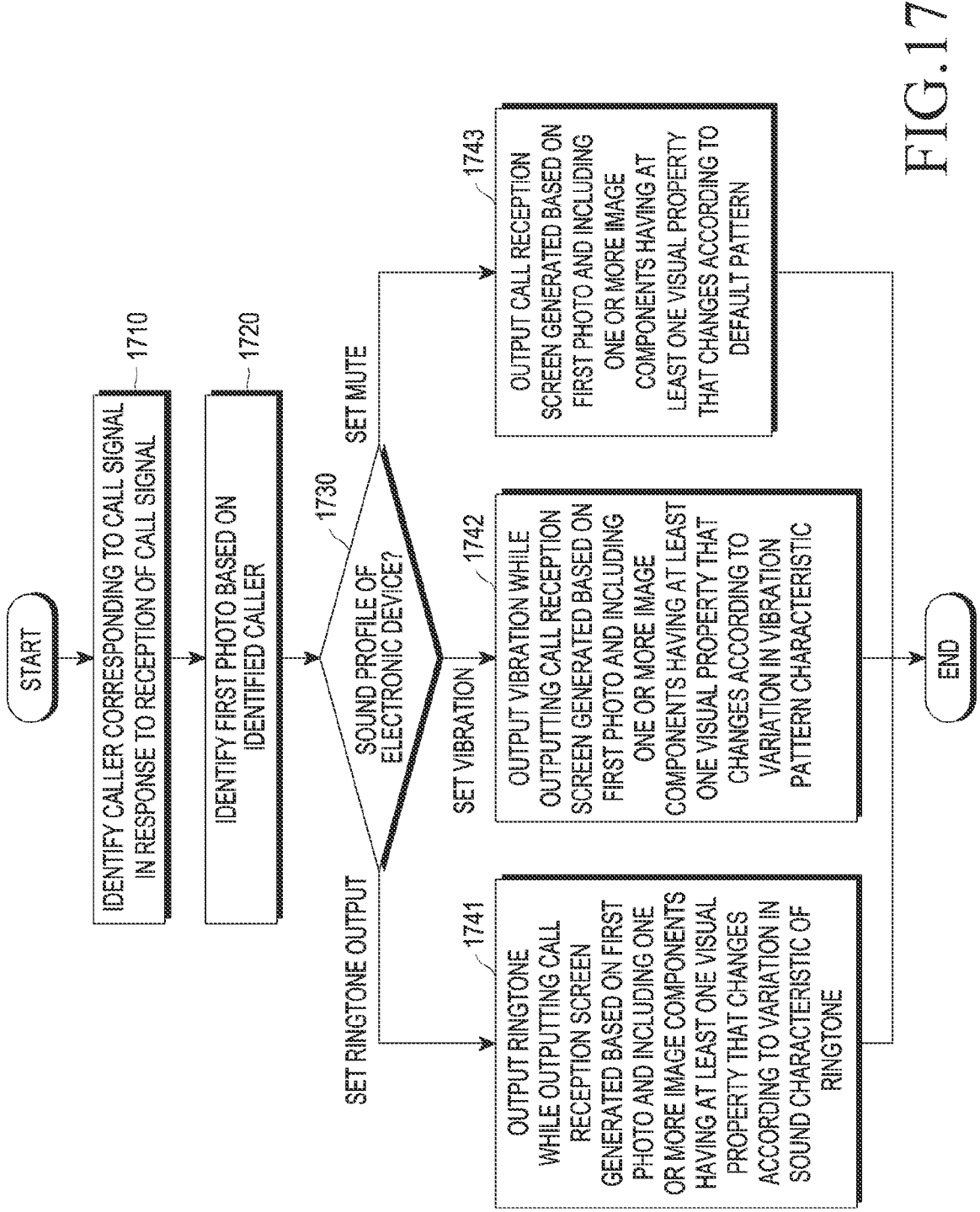
FIG. 17 is a flowchart illustrating operations of an electronic device according to various embodiments.

FIG. 17 is a flowchart illustrating operations of an electronic device according to various embodiments. In operation 1710, the electronic device 101 (e.g., the processor 120) may identify the caller corresponding to a call signal in response to reception of the call signal. Details of the operation of identifying the caller have been described above in connection with operation 210 of FIG. 2 and no duplicate description is given below.

In operation 1720, the electronic device 101 may identify a first photo based on the identified caller. Details of the operation of identifying the first photo have been described above in connection with operation 220 of FIG. 2 and no duplicate description is given below.

In operation 1730, the electronic device 101 may identify a sound profile of the electronic device 101. The sound profile of the electronic device 101 may be one of a ringtone output setting, a vibration setting, and a silent setting.

When the electronic device 101 is set to output a ringtone, in operation 1741, the electronic device 101 may output a ringtone while outputting a call reception screen including one or more image components having at least one visual property that is generated based on the first photo and changes depending on a change in the sound characteristic of the ringtone. Details of the operation of outputting the ringtone while outputting the call reception screen have been described above in connection with operation 230 of FIG. 2 and no duplicate description is given below.

When the electronic device 101 is set to output vibration, in operation 1742, the electronic device 101 may output vibration while outputting a call reception screen including one or more image components having at least one visual property that is generated based on the first photo and changes depending on a change in the characteristics of the vibration pattern. According to various embodiments, the memory 130 of the electronic device 101 may store an association between each phone number stored in the address book application and various vibration patterns. That is, the vibration pattern may be identified corresponding to the caller identified in operation 1710. Alternatively, if the association between the vibration pattern and the caller identified in operation 1710 is not stored, the electronic device 101 may output a vibration pattern set as default. The call reception screen may be output through the display device 160 of the electronic device 101. Further, the vibration may be output through an output device (not shown) of the electronic device 101. The output device of the electronic device 101 may be, e.g., a vibration motor.

When the electronic device 101 is in the silent setting, that is, when the electronic device 101 is set not to output a ringtone or vibration, in operation 1743, the electronic device 101 may output a call reception screen including one or more image components that are generated based on the first photo and have at least one visual property that changes according to the default pattern. The call reception screen may be output through the display device 160 of the electronic device 101.

FIGS. 18A to 18D are views illustrating screens displayed by an electronic device various embodiments. Specifically, FIGS. 18A to 18D illustrate aspects in which a call reception screen is displayed according to various embodiments.

Figure 18A:
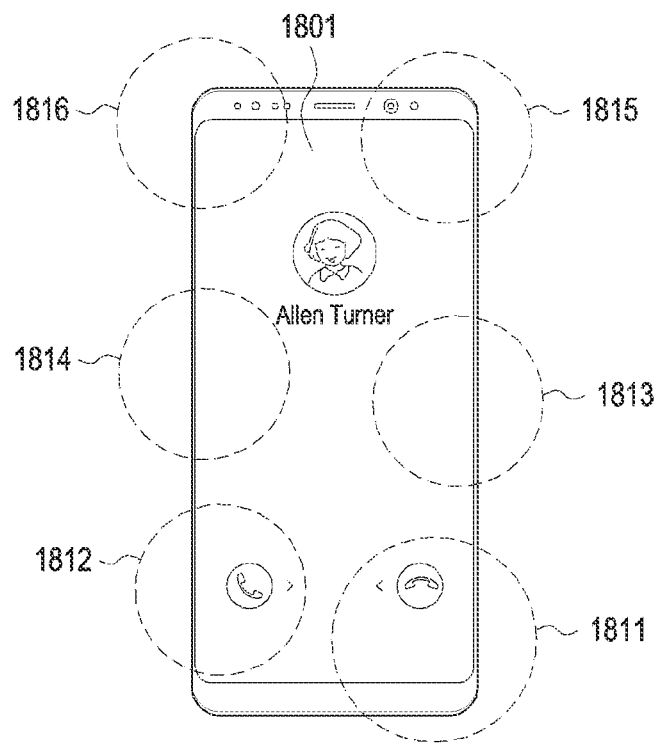
FIGS. 18A to 18D are views illustrating screens displayed by an electronic device various embodiments.
Figure 18B:
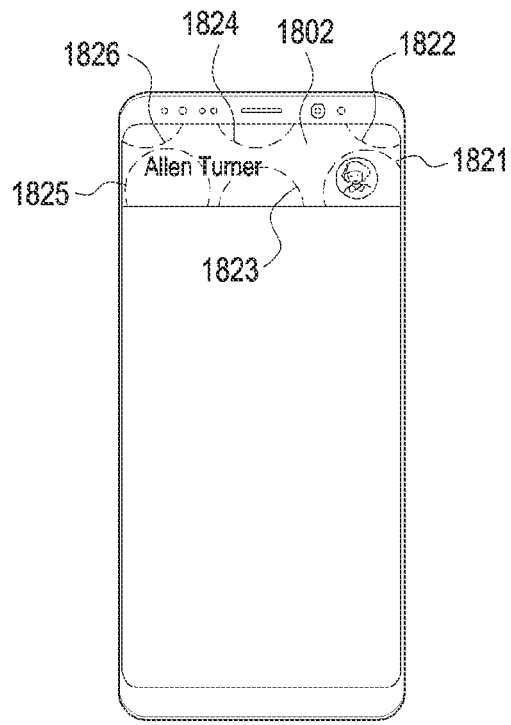
Figure 18C:
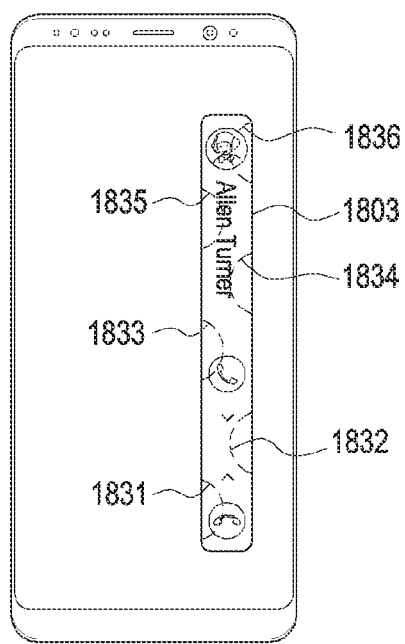
Figure 18D:
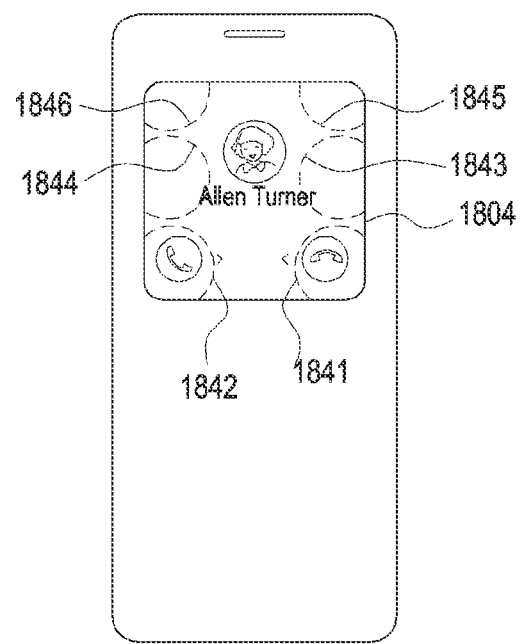

According to various embodiments, as shown in FIG. 18A, a call reception screen 1801 including image components 1811, 1812, 1813, 1814, 1815, and 1816 may be displayed over the entire surface of the display (e.g., the display device 160) of the electronic device 101. According to various embodiments, as shown in FIG. 18B, a call reception screen 1802 including image components 1821, 1822, 1823, 1824, 1825, and 1826 may be displayed only in a top portion of the display (e.g., the display device 160) of the electronic device 101. According to various embodiments, as shown in FIG. 18C, a call reception screen 1803 including image components 1831, 1832, 1833, 1834, 1835, and 1836 may be displayed only in a portion adjacent to the left or right edge of the display (e.g., the display device 160) of the electronic device 101. According to various embodiments, as shown in FIG. 18D, when a case including a cover including a transparent window is mounted on the electronic device, and the electronic device is covered with the cover, a call reception screen 1804 including the image components 1841, 1842, 1843, 1844, 1845, and 1846 may be displayed in a portion of the display covered by the window portion of the cover.

Figure 19A:
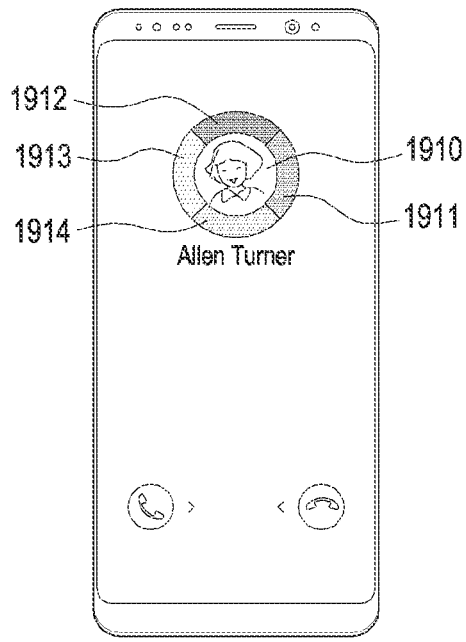
FIGS. 19A to 19D are views illustrating screens displayed by an electronic device various embodiments.
Figure 19B:
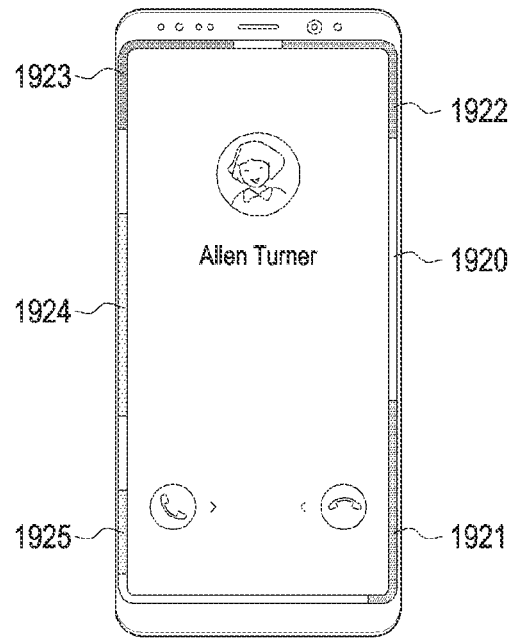
Figure 19C:
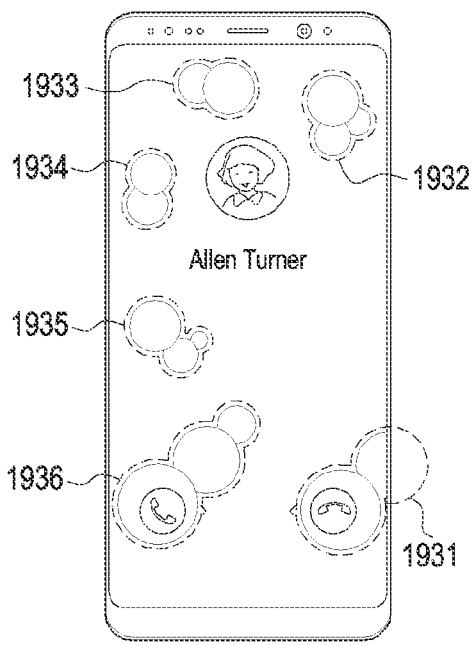
Figure 19D:
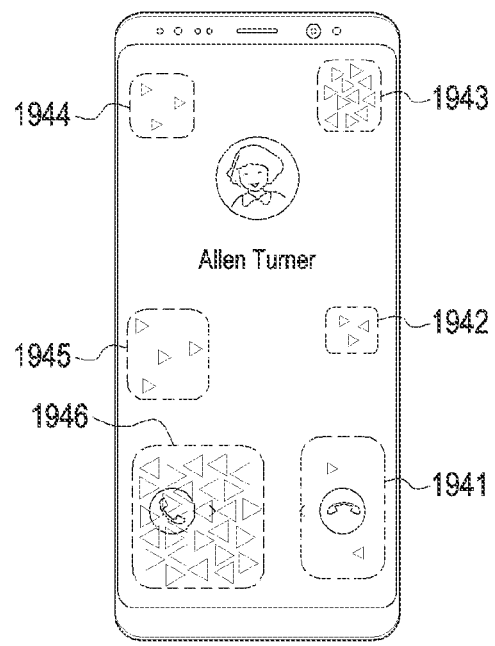

FIGS. 19A to 19D are views illustrating screens displayed by an electronic device various embodiments. Specifically, FIGS. 19A to 19D illustrate shapes of image components according to various embodiments. According to various embodiments, as shown in FIG. 19A, the image components 1911, 1912, 1913, and 1914 may be located around the area 1910 in which the first photo is displayed on the call reception screen and may be blurred. According to various embodiments, as illustrated in FIG. 19B, the image components 1921, 1922, 1923, 1924, and 1925 may be located in a corner area 1920 of the call reception screen. According to various embodiments, as shown in FIG. 19C, the image components 1931, 1932, 1933, 1934, 1935, and 1936 may have particle shapes. According to various embodiments, as illustrated in FIG. 19D, the image components 1941, 1942, 1943, 1944, 1945, and 1946 may be areas including a pattern, and the size and density of the pattern may vary.

According to various embodiments, an electronic device 101 may comprise a communication module 190, a display 160, an output device, and a processor 120. The processor 120 may be configured to identify a caller corresponding to a call signal in response to reception of the call signal through the communication module 190, identify a first photo based on the caller, when the electronic device is configured to output a voice in response to reception of the call signal, output a call reception screen generated based on the first photo in at least a portion of the display 160, the call reception screen including one or more image components having at least one visual property that changes according to a variation in a sound characteristic of a ringtone, and output the ringtone through the output device 155 while outputting the call reception screen.

According to various embodiments, the processor 120 may be configured to identify the ringtone corresponding to the caller.

According to various embodiments, the processor 120 may be configured to, as at least part of identifying the first photo based on the caller, search a memory 130 of the electronic device 101 for the caller's photo and identify the caller's photo searched as the first photo.

According to various embodiments, the processor 120 may be configured to request an external electronic device 104 or 108 (e.g., the external electronic device 302) to provide the caller's photo through the communication module 190 and identify the first photo by receiving the caller's photo from the external electronic device 104 or 108 (e.g., the external electronic device 302) through the communication module 190.

According to various embodiments, the processor 120 may be configured to, when the caller's photo cannot be searched, identify a predesignated lock screen of the electronic device 101 as the first photo.

According to various embodiments, the processor 120 may be configured to set one or more sections on the first photo, identify one or more colors used in each section and a first occupied area proportion of the one or more colors, for each of the one or more sections, select a section representative color for each of the one or more sections, based on the first occupied area proportion of the one or more colors and the one or more colors used in each section, and set a color of one or more image components on the call reception screen to correspond to the section representative color of a section on the first photo corresponding in position to the one or more image components.

According to various embodiments, the processor 120 may be configured to, as at least part of selecting the section representative color for each of the one or more sections, select, as the section representative color, a color having a highest first occupied area proportion for each of the one or more sections and, when there are two adjacent sections having similar section representative colors, to prevent having two adjacent sections with the similar section representative colors, change the section representative color of at least one section of the two adjacent sections having similar section representative colors.

According to various embodiments, the processor 120 may be configured to, as at least part of, when there are two adjacent sections having similar section representative colors, to prevent having two adjacent sections with the similar section representative colors, changing the section representative color of at least one section of the two adjacent sections having similar section representative colors, determine at least one section for which the section representative color is to be changed, when there is at least one color that is not similar to the section representative color and of which the first occupied area proportion exceeds a predetermined value in each of the at least one section for which the section representative color is to be changed, change the section representative color to the color having the highest first occupied area proportion in the section among the colors that are not similar to the section representative color, and when there is no color that is not similar to the section representative color and of which the first occupied area proportion exceeds a predetermined value in each of the at least one section for which the section representative color is to be changed, change the section representative color by adjusting at least some of properties of the section representative color.

According to various embodiments, the processor 120 may be configured to identify one or more background colors based on one or more colors used in the first photo and a second occupied area proportion of each color and set the one or more identified background colors as a background color of the call reception screen.

According to various embodiments, the processor 120 may be configured to, as at least part of identifying the one or more background colors, identify a predetermined number of colors having a highest second occupied area proportion among the one or more colors used in the first photo, identify a color most similar to the predetermined number of colors having the highest second occupied area proportion from a predetermined set of colors, and identify the one or more background colors based on a color included in the predetermined color set, most similar to the predetermined number of colors having the highest second occupied area proportion.

According to various embodiments, the processor 120 may be configured to calculate an rms value for each of a plurality of predetermined frequency bands by performing a short time Fourier transform (STFT) on the ringtone, calculate a weighted average of the rms value for the plurality of predetermined frequency bands, divide the ringtone into a plurality of temporal portions based on a fluctuation, over time, of the weighted average, associate the plurality of temporal portions to the one or more image components, respectively, and generate the call reception screen so that a visual property of the one or more image components, respectively corresponding to the plurality of temporal portions, changes according to the fluctuation over time of the weighted average.

According to various embodiments, the processor 120 may be configured to calculate an average of rms values for a plurality of predetermined frequency bands of the ringtone, divide the ringtone into a plurality of temporal portions based on a fluctuation, over time, of the average of the rms values, associate the plurality of temporal portions to the one or more image components, respectively, and generate the call reception screen so that a visual property of the one or more image components, respectively corresponding to the plurality of temporal portions, changes according to the fluctuation over time of the average of the rms values.

According to various embodiments, the processor 120 may be configured to calculate a temporal average of audio volume for each of the plurality of temporal portions and generate the call reception screen so that a visual property of the one or more image components, respectively corresponding to the plurality of temporal portions, changes according to the temporal average of the audio volume.

According to various embodiments, the one or more image components may sequentially correspond to the plurality of temporal portions.

According to various embodiments, the processor 120 may be configured to, when the electronic device 101 is configured to output a vibration in response to reception of the call signal, output a call reception screen generated based on the first photo in at least a portion of the display 160, the call reception screen including one or more image components having at least one visual property that changes according to a variation in a characteristic of a vibration pattern, and output the vibration through the output device while outputting the call reception screen.

According to various embodiments, the processor 120 may be configured to when the electronic device 101 is configured not to output a voice or vibration in response to reception of the call signal, output a call reception screen generated based on the first photo in at least a portion of the display 160, the call reception screen including one or more image components having at least one visual property that changes according to a default pattern.

According to various embodiments, an electronic device 101 may comprise a communication module 190, a display 160, and a processor 120. The processor 120 may be configured to identify at least one photo respectively corresponding to at least one caller stored in the electronic device 101, identify a plurality of section representative colors identified for each of a plurality of sections of each of the at least one photo, obtain a call reception screen corresponding to each of the at least one caller, based on the plurality of identified call reception screens, and display a call reception screen associated with a caller corresponding to a call signal through the display 160, in response to reception of the call signal through the communication module 190.

According to various embodiments, a method performed on an electronic device 101 may comprise identifying a caller corresponding to a call signal in response to reception of the call signal through the communication module 190, identifying a first photo based on the caller, when the electronic device 101 is configured to output a voice in response to reception of the call signal, outputting a call reception screen generated based on the first photo in at least a portion of the display 160, the call reception screen including one or more image components having at least one visual property that changes according to a variation in a sound characteristic of a ringtone, and outputting the ringtone through the output device while outputting the call reception screen.

According to various embodiments, the method of operating the electronic device 101 may further include identifying the ringtone corresponding to the caller.

According to various embodiments, as at least part of identifying the first photo based on the caller, the method of operating the electronic device 101 may further include searching a memory 130 of the electronic device 101 for the caller's photo and identifying the caller's photo searched as the first photo.

According to various embodiments, the method of operating the electronic device 101 may include requesting an external electronic device 104 or 108 (e.g., the external electronic device 302) to provide the caller's photo through the communication module 190 and identifying the first photo by receiving the caller's photo from the external electronic device 104 or 108 (e.g., the external electronic device 302) through the communication module 190.

According to various embodiments, the method of operating the electronic device 101 may further include, when the caller's photo cannot be searched, identifying a predesignated lock screen of the electronic device 101 as the first photo.

According to various embodiments, the method of operating the electronic device 101 may further include setting one or more sections on the first photo, identifying one or more colors used in each section and a first occupied area proportion of the one or more colors, for each of the one or more sections, selecting a section representative color for each of the one or more sections, based on the first occupied area proportion of the one or more colors and the one or more colors used in each section, and setting a color of one or more image components on the call reception screen to correspond to the section representative color of a section on the first photo corresponding in position to the one or more image components.

According to various embodiments, the method of operating the electronic device 101 may further include, as at least part of selecting the section representative color for each of the one or more sections, selecting, as the section representative color, a color having a highest first occupied area proportion for each of the one or more sections and, when there are two adjacent sections having similar section representative colors, to prevent having two adjacent sections with the similar section representative colors, changing the section representative color of at least one section of the two adjacent sections having similar section representative colors.

According to various embodiments, the method of operating the electronic device 101 may further include, as at least part of, when there are two adjacent sections having similar section representative colors, to prevent having two adjacent sections with the similar section representative colors, changing the section representative color of at least one section of the two adjacent sections having similar section representative colors, determining at least one section for which the section representative color is to be changed, when there is at least one color that is not similar to the section representative color and of which the first occupied area proportion exceeds a predetermined value in each of the at least one section for which the section representative color is to be changed, changing the section representative color to the color having the highest first occupied area proportion in the section among the colors that are not similar to the section representative color, and when there is no color that is not similar to the section representative color and of which the first occupied area proportion exceeds a predetermined value in each of the at least one section for which the section representative color is to be changed, changing the section representative color by adjusting at least some of properties of the section representative color.

According to various embodiments, the method of operating the electronic device 101 may further include identifying one or more background colors based on one or more colors used in the first photo and a second occupied area proportion of each color and setting the one or more identified background colors as a background color of the call reception screen.

According to various embodiments, the method of operating the electronic device 101 may further include, as at least part of identifying the one or more background colors, identifying a predetermined number of colors having a highest second occupied area proportion among the one or more colors used in the first photo, identifying a color most similar to the predetermined number of colors having the highest second occupied area proportion from a predetermined set of colors, and identifying the one or more background colors based on a color included in the predetermined color set, most similar to the predetermined number of colors having the highest second occupied area proportion.

According to various embodiments, the method of operating the electronic device 101 may further include calculating an rms value for each of a plurality of predetermined frequency bands by performing a short time Fourier transform (STFT) on the ringtone, calculating a weighted average of the rms value for the plurality of predetermined frequency bands, dividing the ringtone into a plurality of temporal portions based on a fluctuation, over time, of the weighted average, associating the plurality of temporal portions to the one or more image components, respectively, and generating the call reception screen so that a visual property of the one or more image components, respectively corresponding to the plurality of temporal portions, changes according to the fluctuation over time of the weighted average.

According to various embodiments, the method of operating the electronic device 101 may further include calculating an average of rms values for a plurality of predetermined frequency bands of the ringtone, dividing the ringtone into a plurality of temporal portions based on a fluctuation, over time, of the average of the rms values, associating the plurality of temporal portions to the one or more image components, respectively, and generating the call reception screen so that a visual property of the one or more image components, respectively corresponding to the plurality of temporal portions, changes according to the fluctuation over time of the average of the rms values.

According to various embodiments, the method of operating the electronic device 101 may further include calculating a temporal average of audio volume for each of the plurality of temporal portions and generating the call reception screen so that a visual property of the one or more image components, respectively corresponding to the plurality of temporal portions, changes according to the temporal average of the audio volume.

According to various embodiments, the one or more image components may sequentially correspond to the plurality of temporal portions.

According to various embodiments, the method of operating the electronic device 101 may further include, when the electronic device 101 is configured to output a vibration in response to reception of the call signal, outputting a call reception screen generated based on the first photo in at least a portion of the display 160, the call reception screen including one or more image components having at least one visual property that changes according to a variation in a characteristic of a vibration pattern, and outputting the vibration through the output device while outputting the call reception screen.

According to various embodiments, the method of operating the electronic device 101 may further include, when the electronic device 101 is configured not to output a voice or vibration in response to reception of the call signal, outputting a call reception screen generated based on the first photo in at least a portion of the display 160, the call reception screen including one or more image components having at least one visual property that changes according to a default pattern.

According to various embodiments, a method of operating an electronic device 101 may comprise identifying at least one photo respectively corresponding to at least one caller stored in the electronic device 101, identifying a plurality of section representative colors identified for each of a plurality of sections of each of the at least one photo, obtaining a call reception screen corresponding to each of the at least one caller, based on the plurality of identified call reception screens, and displaying a call reception screen associated with a caller corresponding to a call signal through the display 160, in response to reception of the call signal through the communication module 190.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it may be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

The invention claimed is:

1. An electronic device, comprising:
a communication module;
a display;
an output device; and
a processor configured to:
identify a caller corresponding to a call signal in response to reception of the call signal through the communication module;
identify a first photo based on the caller;
when the electronic device is configured to output a sound in response to reception of the call signal, output a call reception screen generated based on the first photo in at least a portion of the display, the call reception screen including one or more image components having at least one visual property that changes according to a variation in a sound characteristic of a ringtone;
output the ringtone through the output device while outputting the call reception screen;
set one or more sections on the first photo;
identify one or more colors used in each section and a first occupied area proportion of the one or more colors, for each of the one or more sections;
select a section representative color for each of the one or more sections, based on the first occupied area proportion of the one or more colors and the one or more colors used in each section; and
set a color of the one or more image components on the call reception screen based on the section representative color for each of the one or more sections.

2. The electronic device of claim 1, wherein the processor is configured to identify the ringtone corresponding to the caller.

3. The electronic device of claim 1, wherein the processor is configured to, as at least part of identifying the first photo based on the caller:
search a memory of the electronic device for the caller's photo and identify the caller's photo searched as the first photo;
when the caller's photo cannot be searched, identify a predesignated lock screen of the electronic device as the first photo; or
request an external electronic device to provide the caller's photo through the communication module and identify the caller's photo received from the external electronic device through the communication module as the first photo.

4. The electronic device of claim 1, wherein the processor is configured to, as at least part of selecting the section representative color for each of the one or more sections:
select, as the section representative color, a color having a highest first occupied area proportion for each of the one or more sections;
when there are two adjacent sections having similar section representative colors, to prevent having two adjacent sections with the similar section representative colors:
determine at least one section for which the section representative color is to be changed;
when there is at least one color that is not similar to the section representative color and of which the first occupied area proportion exceeds a predetermined value in each of the at least one section for which the section representative color is to be changed, change the section representative color to the color having the highest first occupied area proportion in the section among the colors that are not similar to the section representative color; and when there is no color that is not similar to the section representative color and of which the first occupied area proportion exceeds a predetermined value in each of the at least one section for which the section representative color is to be changed, change the section representative color by adjusting at least some of properties of the section representative color.

5. The electronic device of claim 1, wherein the processor is configured to:
identify one or more background colors based on one or more colors used in the first photo and a second occupied area proportion of each color; and
set the one or more identified background colors as a background color of the call reception screen.

6. The electronic device of claim 5, wherein the processor is configured to, as at least part of identifying the one or more background colors:
identify a predetermined number of colors having a highest second occupied area proportion among the one or more colors used in the first photo;
identify a color most similar to the predetermined number of colors having the highest second occupied area proportion from a predetermined set of colors; and
identify the one or more background colors based on a color included in the predetermined color set, most similar to the predetermined number of colors having the highest second occupied area proportion.

7. The electronic device of claim 1, wherein the processor is configured to:
calculate an rms value for each of a plurality of predetermined frequency bands by performing a short time Fourier transform (STFT) on the ringtone;
calculate a weighted average of the rms value for the plurality of predetermined frequency bands;
divide the ringtone into a plurality of temporal portions based on a fluctuation, over time, of the weighted average;
associate the plurality of temporal portions to the one or more image components, respectively; and
generate the call reception screen so that a visual property of the one or more image components, respectively corresponding to the plurality of temporal portions, changes according to the fluctuation over time of the weighted average.

8. The electronic device of claim 1, wherein the processor is configured to:
calculate an average of rms values for a plurality of predetermined frequency bands of the ringtone;
divide the ringtone into a plurality of temporal portions based on a fluctuation, over time, of the average of the rms values;
associate the plurality of temporal portions to the one or more image components, respectively; and
generate the call reception screen so that a visual property of the one or more image components, respectively corresponding to the plurality of temporal portions, changes according to the fluctuation over time of the average of the rms values.

9. The electronic device of claim 7, wherein the processor is configured to:
calculate a temporal average of audio volume for each of the plurality of temporal portions; and
generate the call reception screen so that a visual property of the one or more image components, respectively corresponding to the plurality of temporal portions, changes according to the temporal average of the audio volume.

10. The electronic device of claim 7, wherein the one or more image components sequentially correspond to the plurality of temporal portions.

11. The electronic device of claim 1, wherein the processor is configured to:
when the electronic device is configured to output a vibration in response to reception of the call signal, output a call reception screen generated based on the first photo in at least a portion of the display, the call reception screen including one or more image components having at least one visual property that changes according to a variation in a characteristic of a vibration pattern; and
output the vibration through the output device while outputting the call reception screen.

12. The electronic device of claim 1, wherein the processor is configured to, when the electronic device is configured not to output a sound or vibration in response to reception of the call signal, output a call reception screen generated based on the first photo in at least a portion of the display, the call reception screen including one or more image components having at least one visual property that changes according to a default pattern.

13. A method performed on an electronic device, the method comprising:
identifying a caller corresponding to a call signal in response to reception of the call signal through a communication module of the electronic device;
identifying a first photo based on the caller;
when the electronic device is configured to output a sound in response to reception of the call signal, outputting a call reception screen generated based on the first photo in at least a portion of the display, the call reception screen including one or more image components having at least one visual property that changes according to a variation in a sound characteristic of a ringtone;
outputting the ringtone through the output device while outputting the call reception screen;
setting one or more sections on the first photo;
identifying one or more colors used in each section and a first occupied area proportion of the one or more colors, for each of the one or more sections;
selecting a section representative color for each of the one or more sections, based on the first occupied area proportion of the one or more colors and the one or more colors used in each section; and
setting a color of the one or more image components on the call reception screen based on the section representative color for each of the one or more sections.

14. An electronic device, comprising:
a communication module;
a display; and
a processor configured to:
identify at least one photo respectively corresponding to at least one caller stored in the electronic device;
identify a plurality of section representative colors identified for each of a plurality of sections of each of the at least one photo;

obtain at least one call reception screen corresponding to the at least one caller, based on the plurality of section representative colors;

display a call reception screen associated with a caller corresponding to a call signal through the display, in response to reception of the call signal through the communication module;

set one or more sections on a photo;

identify one or more colors used in each section and a first occupied area proportion of the one or more colors, for each of the one or more sections;

select a section representative color for each of the one or more sections, based on the first occupied area proportion of the one or more colors and the one or more colors used in each section; and set a color of one or more image components on the call reception screen based on the section representative color for each of the one or more sections.

* * * * *